United States Patent
Fujie et al.

(10) Patent No.: US 10,496,576 B2
(45) Date of Patent: Dec. 3, 2019

(54) COMMUNICATION APPARATUS

(71) Applicant: Mitsubishi Electric Corporation, Tokyo (JP)

(72) Inventors: Kenichi Fujie, Tokyo (JP); Isao Tottori, Tokyo (JP); Katsuya Tsujimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 89 days.

(21) Appl. No.: 15/542,158

(22) PCT Filed: May 22, 2015

(86) PCT No.: PCT/JP2015/064702
§ 371 (c)(1),
(2) Date: Jul. 7, 2017

(87) PCT Pub. No.: WO2016/189578
PCT Pub. Date: Dec. 1, 2016

(65) Prior Publication Data
US 2018/0267915 A1    Sep. 20, 2018

(51) Int. Cl.
*G06F 13/362* (2006.01)
*G06F 13/42* (2006.01)
(Continued)

(52) U.S. Cl.
CPC .......... *G06F 13/362* (2013.01); *G06F 13/385* (2013.01); *G06F 13/4291* (2013.01);
(Continued)

(58) Field of Classification Search
CPC .. G06F 13/364; G06F 13/362; G06F 13/4291; G06F 13/4282; G06F 13/26; G06F 13/18
See application file for complete search history.

(56) References Cited

U.S. PATENT DOCUMENTS

2006/0036704 A1   2/2006   Kanekawa et al.
2006/0118359 A1   6/2006   Purvis
(Continued)

FOREIGN PATENT DOCUMENTS

JP   2005-158058 A   6/2005
JP   2014-086876 A   5/2014
(Continued)

OTHER PUBLICATIONS

Communication dated Dec. 5, 2018 from the European Patent Office in application No. 15893214.5.
(Continued)

*Primary Examiner* — Ernest Unelus
(74) *Attorney, Agent, or Firm* — Sughrue Mion, PLLC; Richard C. Turner

(57) ABSTRACT

The present invention is an SPI-communication-method communication apparatus that has a plurality of slave communication units for a single master communication unit and an electric power converter utilizing the communication apparatus; the master communication unit outputs communication signals simultaneously to all of the slave communication units and separately reads respective data signals outputted by the slave communication units, in accordance with a priority.

7 Claims, 15 Drawing Sheets

(51) Int. Cl.
*G06F 13/38* (2006.01)
*G05B 19/042* (2006.01)

(52) U.S. Cl.
CPC .......... *G05B 19/0421* (2013.01); *Y02D 10/14* (2018.01); *Y02D 10/151* (2018.01)

(56) References Cited

U.S. PATENT DOCUMENTS

| | | |
|---|---|---|
| 2006/0137259 A1 | 6/2006 | Purvis |
| 2006/0145131 A1 | 7/2006 | Purvis |
| 2006/0179731 A1 | 8/2006 | Purvis |
| 2011/0078350 A1 | 3/2011 | Carls |
| 2012/0072628 A1 | 3/2012 | Crockett et al. |
| 2012/0072629 A1* | 3/2012 | Tokuda ................ G06F 13/364 710/110 |
| 2014/0115212 A1 | 4/2014 | Kazuno et al. |
| 2015/0280623 A1 | 10/2015 | Fujie et al. |

FOREIGN PATENT DOCUMENTS

| | | |
|---|---|---|
| WO | 2005/050464 A1 | 6/2005 |
| WO | 2014/068752 A1 | 5/2014 |

OTHER PUBLICATIONS

International Search Report of PCT/JP2015/064702 dated Aug. 25, 2015.
Communication dated Jul. 17, 2019, from the European Patent Office in counterpart European Application No. 15 893 214.5.

* cited by examiner

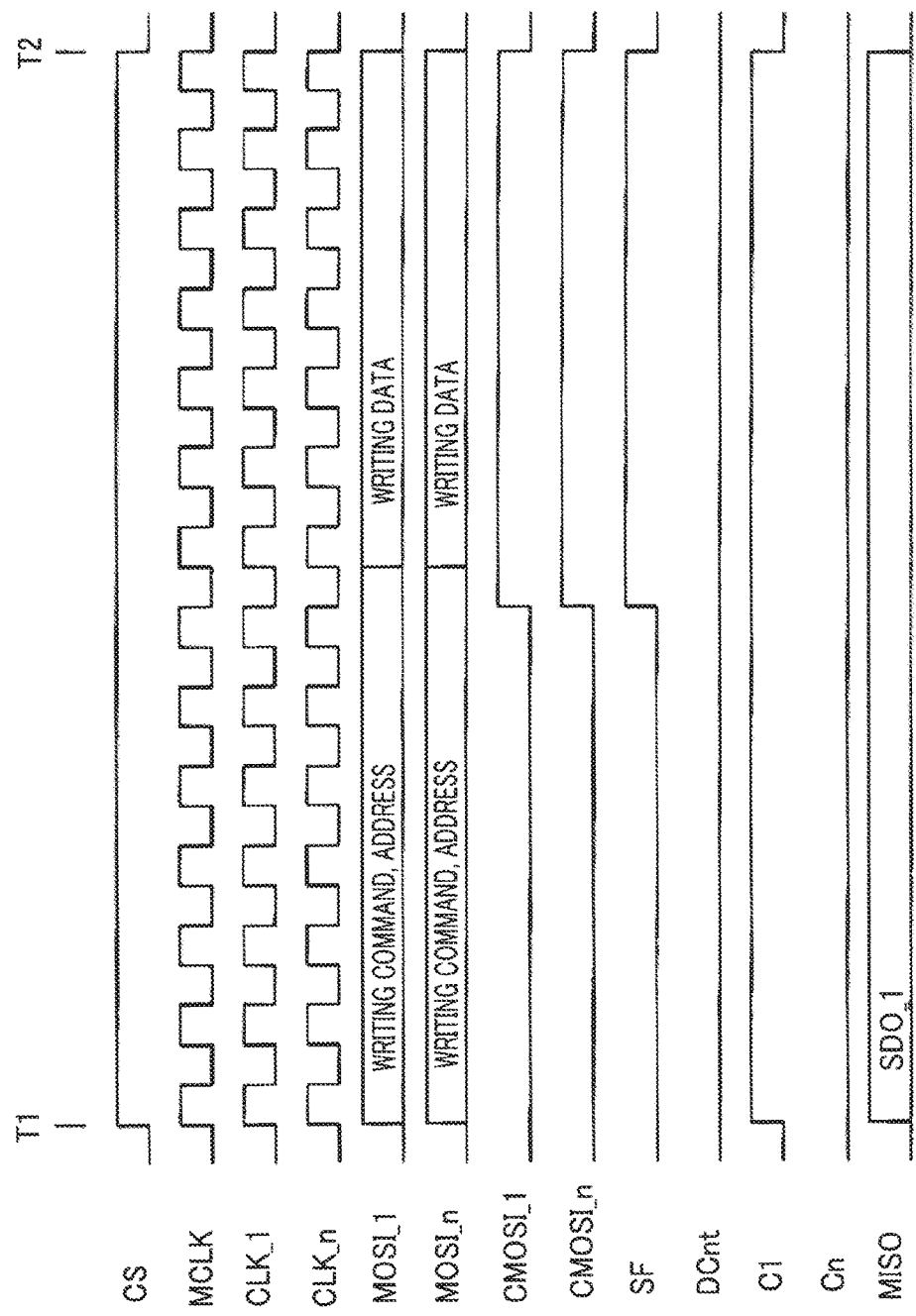

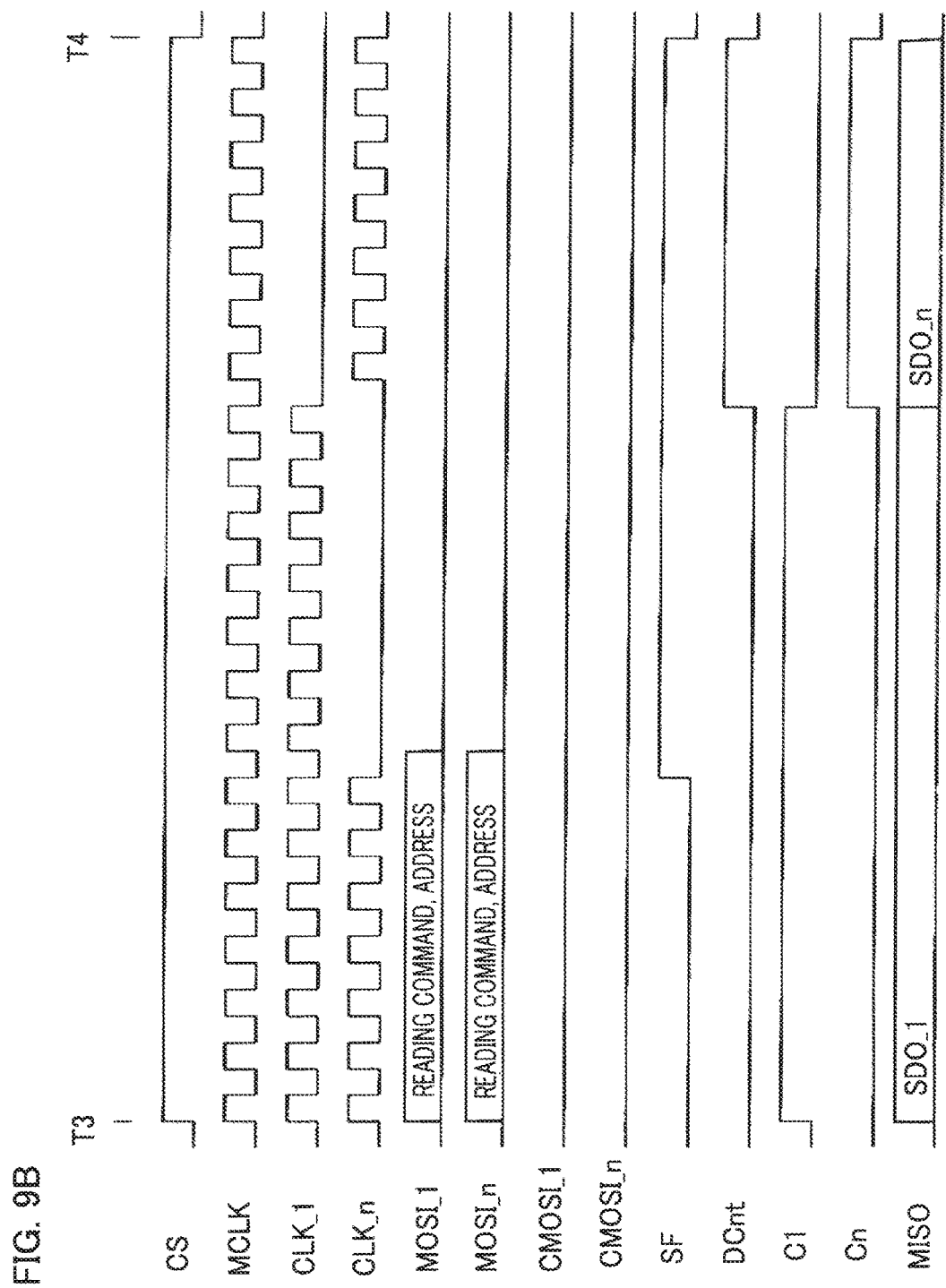

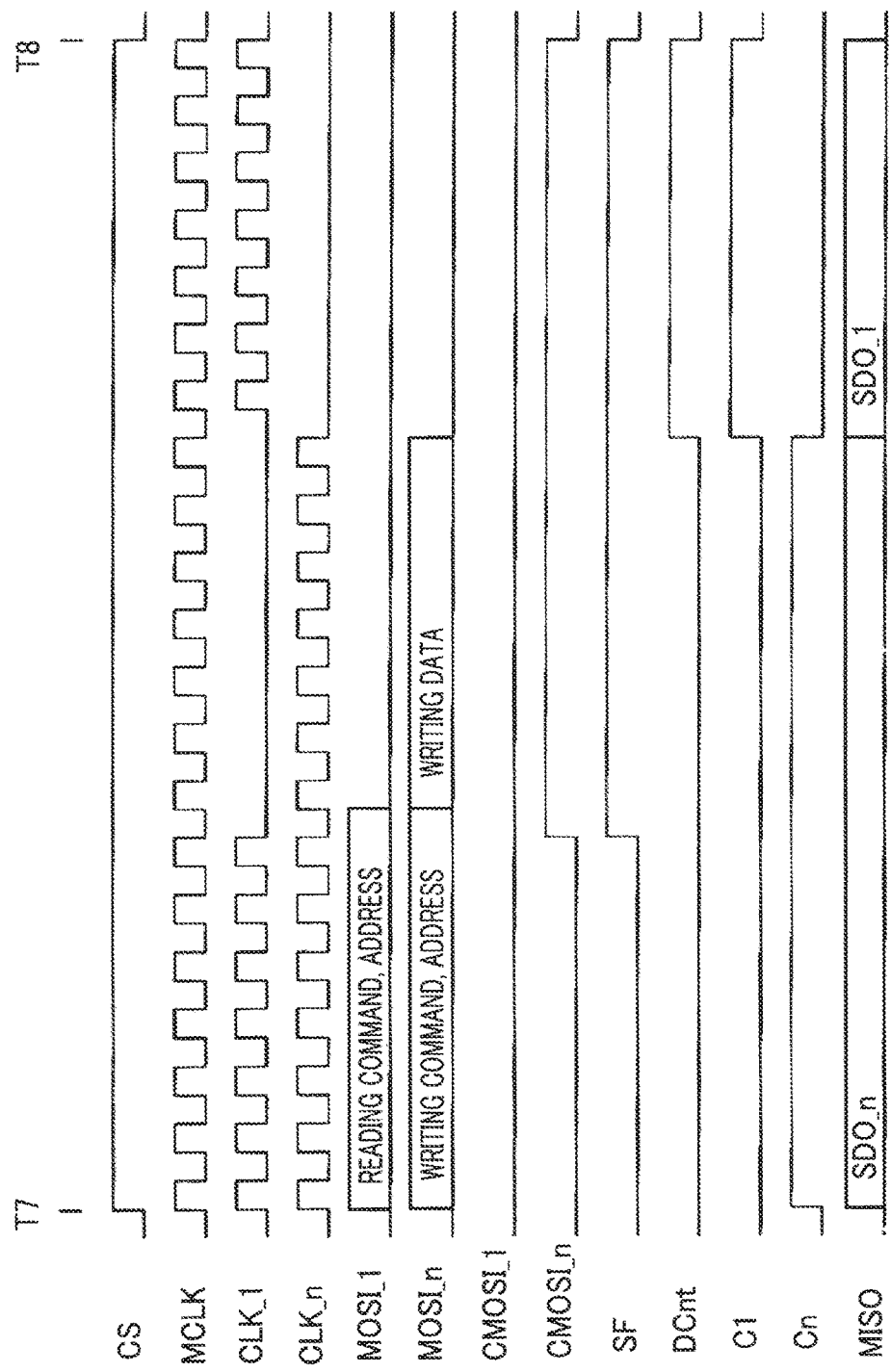

COMMUNICATION APPARATUS

CROSS REFERENCE TO RELATED APPLICATIONS

This application is a National Stage of International Application No. PCT/JP2015/065702 filed May 22, 2015, the contents of which are incorporated herein by reference it its entirety.

TECHNICAL FIELD

The present invention relates to a serial-communication-method communication apparatus utilizing, an SPI (Serial Peripheral Interface) and to an electric power converter utilizing the communication apparatus.

BACKGROUND ART

To date, serial-communication-method communication apparatus utilizing an SPI has been widely utilized, and various kinds of methods therefor have been proposed. For example, in Patent Document 1, there is proposed a communication circuit including a reception unit that serially receives, as a set of input data pieces, a command and a synchronization identification code that is different from the command and a determination unit that receives the synchronization identification code from the reception unit and gives an instruction of starting implementation of response processing based on the command when the synchronization identification code coincides with a predetermined value; the configuration of this communication circuit makes it possible to apply this communication circuit to a 3-line SPI having three serial-communication terminals or a 4-line SPI having four serial-communication terminals; thus, it is allegedly claimed that a high-reliability serial communication circuit and the like can be realized.

PRIOR ART REFERENCE

Patent Document

[Patent Document 1] Japanese Patent Application Laid-Open No. 2014-86876

DISCLOSURE OF THE INVENTION

Problems to be Solved by the Invention

However, in the case where in the conventional communication apparatus disclosed in Patent Document 1, a data bus is shared in order to reduce the number of communication lines, there has been a problem that when each of the slaves performs communication in a procedure conforming to a communication protocol, it takes a long time before all the communication actions are completed. In particular, there has been a problem that because a circuit configuration having a low processing ability delays processing, it is not made possible to satisfy a request. When it takes a long time to perform communication, there occur differences in timings when the respective slaves start to perform post-communication actions; in an electric power converter, in particular, in the case where a plurality of electric-power conversion units are utilized as the slaves, the differences in the operation timings of the electric-power conversion units may induce a secondary failure in the electric-power conversion unit.

The present invention has been implemented in order to solve the foregoing problems in the conventional communication apparatus; the objective thereof is to provide a communication apparatus that shortens the communication time so as to make it possible to perform communication processing even with a circuit configuration having a low processing ability and that can decrease the differences in the post-communication operation timings of the respective slaves.

In addition, the objective of the present invention is to provide an electric power converter that utilizes a communication apparatus that shortens the communication time so as to make it possible to perform communication processing even with a circuit configuration having a low processing ability and that can decrease the differences in the post-communication operation timings of the respective slaves, and that can diminish the differences among the operation timings of two or more electric-power conversion units.

Means for Solving the Problems

A communication apparatus according to the present invention has a master communication unit that functions as a master and a slave communication unit that functions as a slave for the master communication unit, and performs serial communication by use of an SPI; the communication apparatus is characterized in that two or more of the slave communication units are provided for the master communication unit, and the master communication unit outputs communication signals simultaneously to the two or more of the slave communication units.

In an electric power converter according to the present invention, a plurality of phase bridge circuits that each are formed by serially connecting an upper arm provided with a power semiconductor switching device with a lower arm provided with a power semiconductor switching device are connected in parallel with one another; a chargeable and dischargeable DC power source is connected across each of the phase bridge circuits; the serial connection point in each of the phase bridge circuits is connected with an AC terminal of the armature winding of a multi-phase rotating electric machine, and electric-power conversion between the DC power source and the multi-phase AC rotating electric machine is performed. The electric power converter has a control unit provided with a master communication unit and gate driving units that are provided in the respective phase bridge circuits and that each have a slave communication unit; the electric power converter is characterized in that the master communication unit performs communication with the slave communication unit by use of the communication apparatus according to any one of claims 1 through 6 and in that based on the communication by the communication apparatus, driving of each of the phase bridge circuits is controlled.

Advantage of the Invention

A communication apparatus according to the present invention can shorten the communication time and makes it possible that even a low-processing-ability circuit configuration performs communication processing; thus, the cost can be reduced and the differences in the respective post-communication operation timings of the slaves can also be decreased.

An electric power converter according to the present invention can shorten the communication time and hence makes it possible that even a low-processing-ability circuit configuration performs communication processing; thus, the cost can be reduced and the differences in the respective post-communication operation timings of the slaves can also be decreased.

Figure 5:
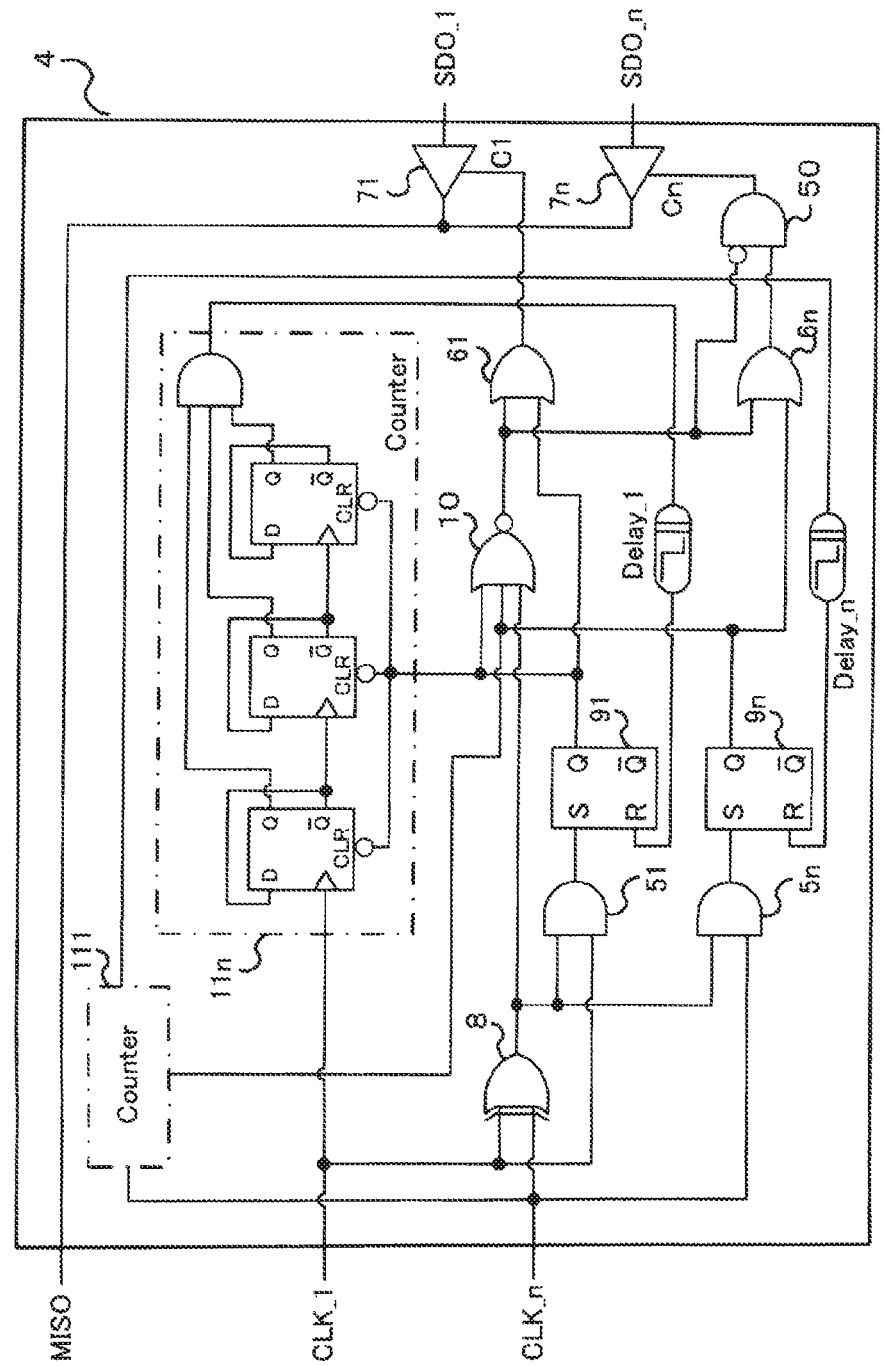
Figure 6:
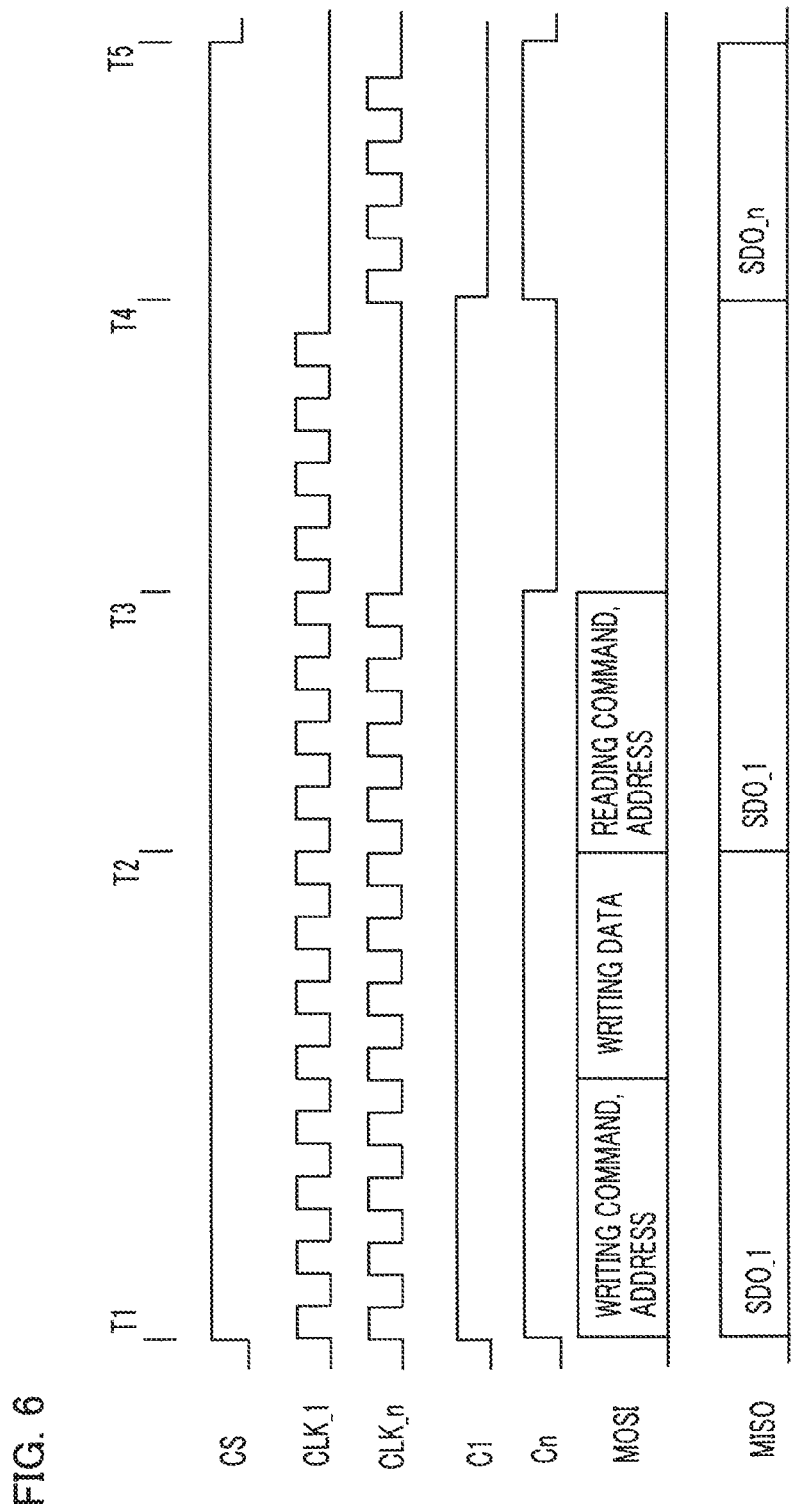
Figure 7:
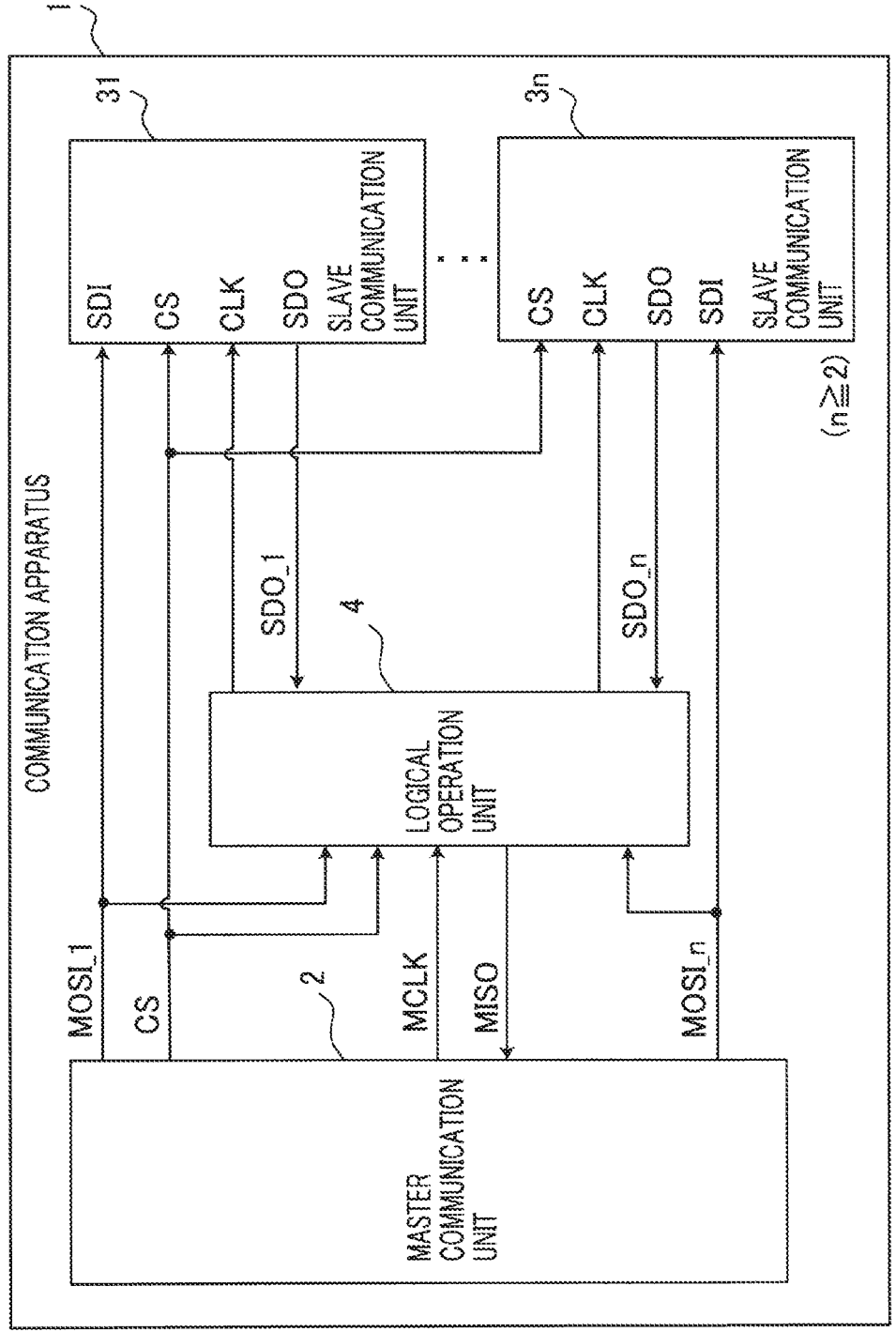
Figure 8:
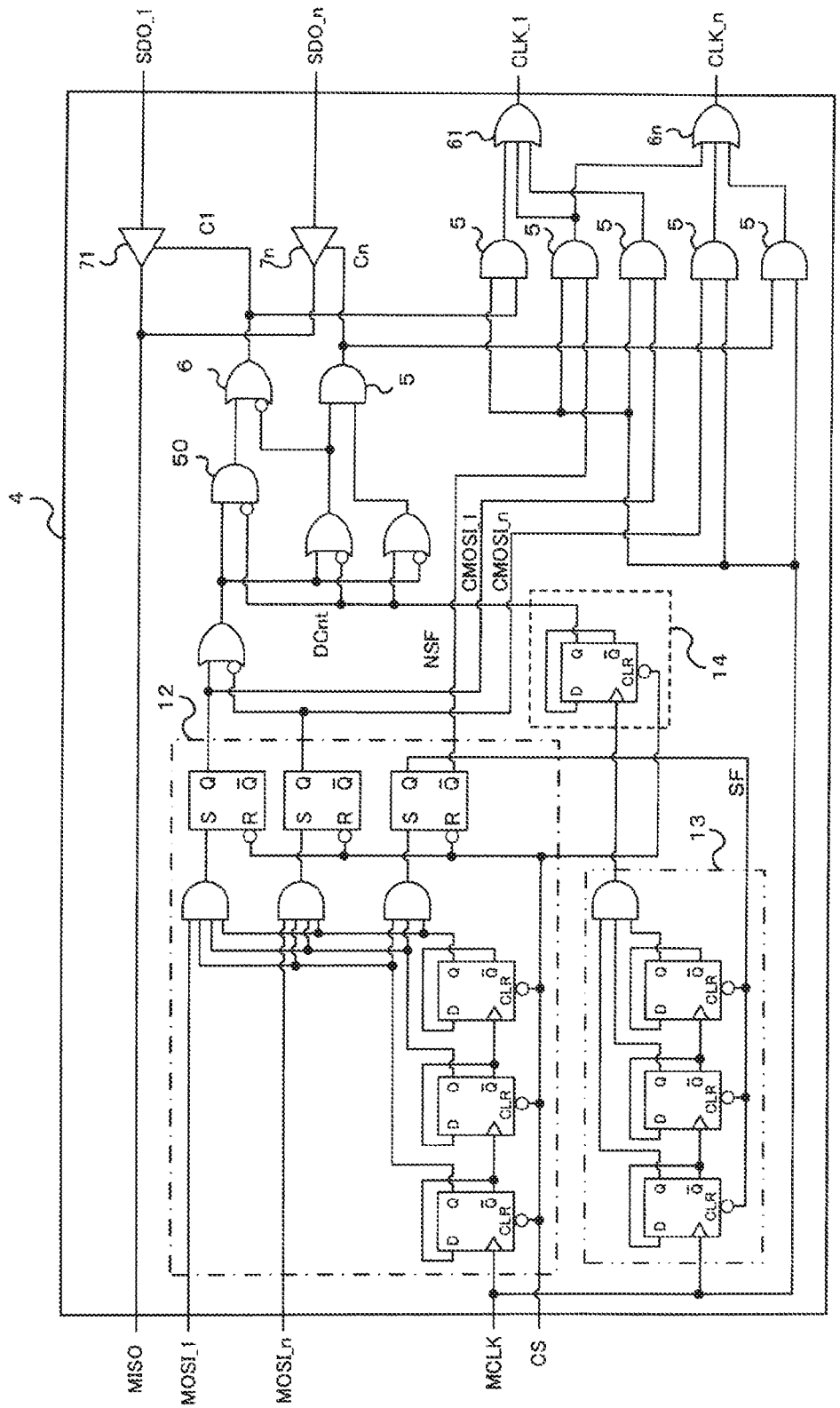
Figure 9C:
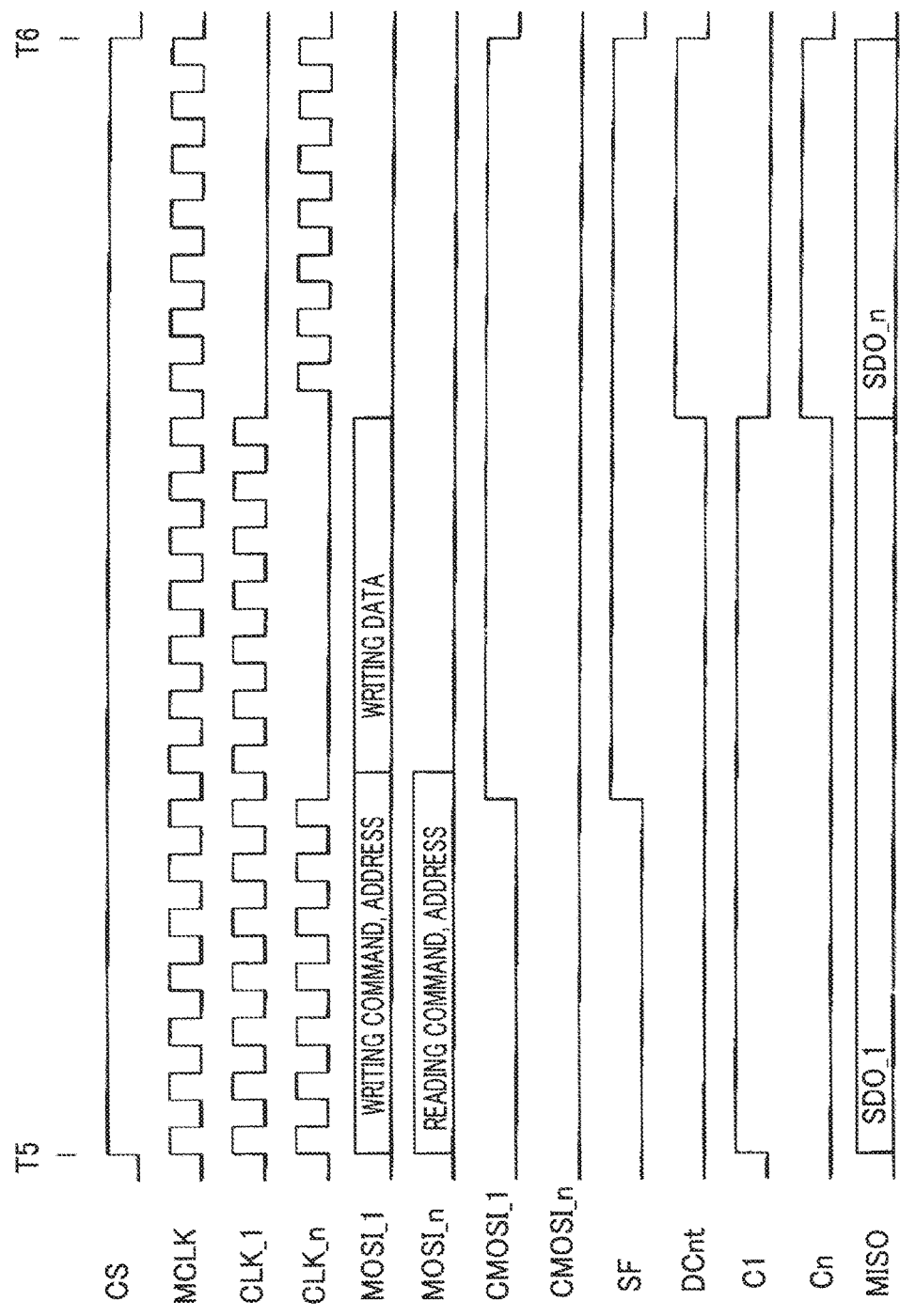
Figure 10:
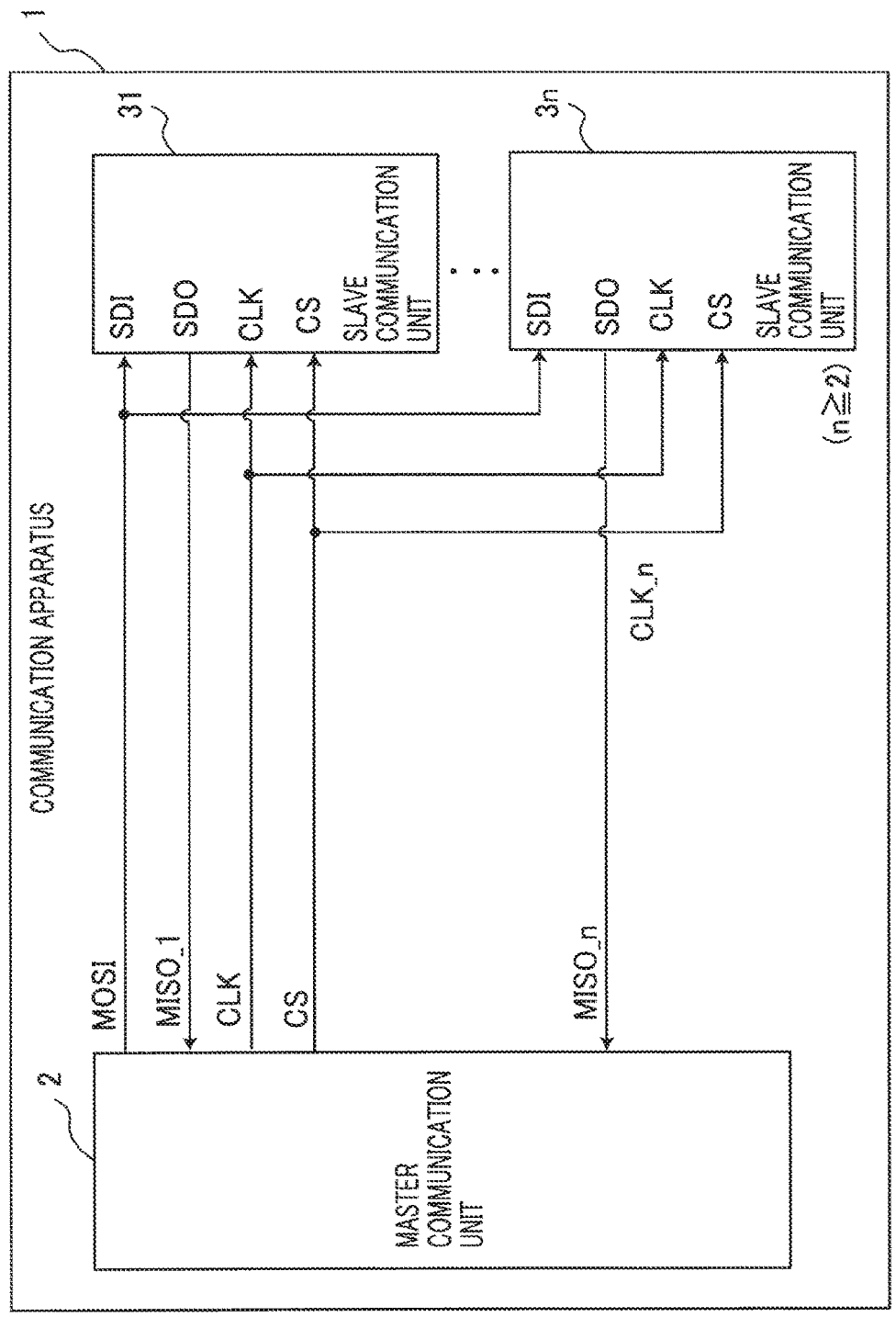
Figure 11:
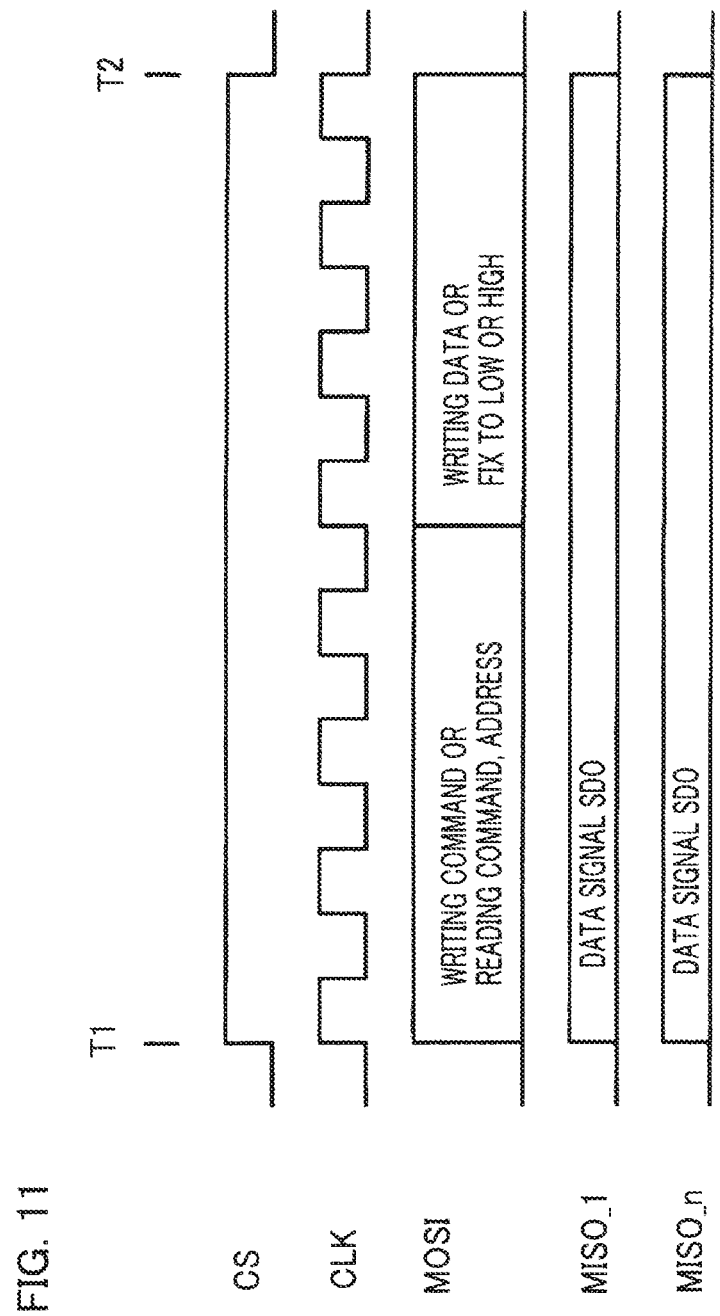
Figure 12:
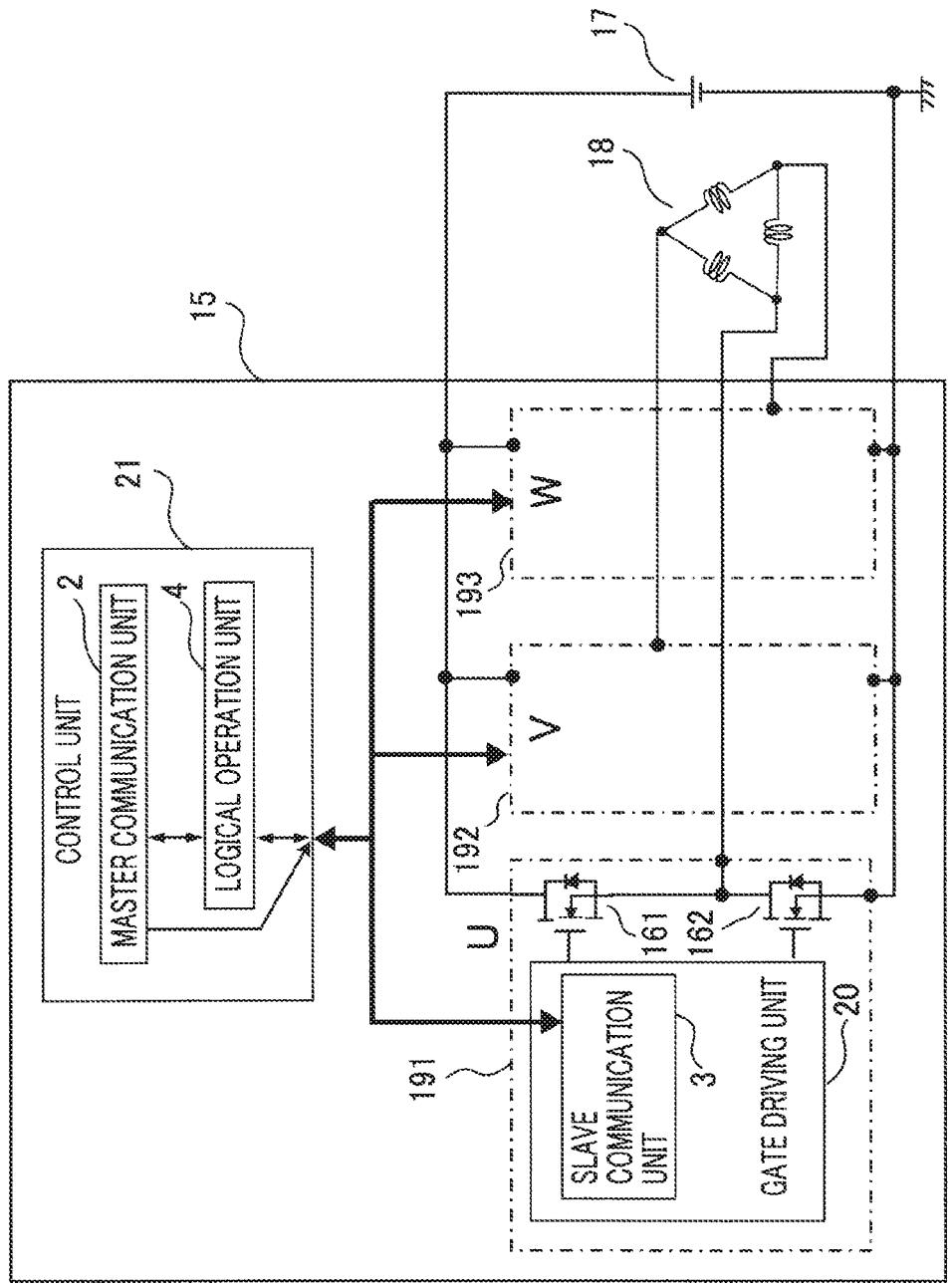

FIG, 4 is a block diagram representing, the configuration of communication apparatus according to Embodiment 2 of the present invention;

FIG. 5 is a circuit diagram representing an example of logical operation unit in the communication apparatus according to Embodiment 2 of the present invention;

FIG. 6 is a timing chart explaining the operation of the communication apparatus according to Embodiment 2 of the present invention;

FIG. 7 is a block diagram representing the configuration of a communication apparatus according to Embodiment 3 of the present invention;

FIG. 8 is a circuit diagram representing an example of logical operation unit in the communication apparatus according to Embodiment 3 of the present invention;

FIG. 9A is a timing chart explaining the operation of the communication apparatus according to Embodiment 3 of the present invention;

FIG. 9B is another timing chart explaining the operation of the communication apparatus according to Embodiment 3 of the present invention;

FIG. 9C is further another timing chart explaining the operation of the communication apparatus according to Embodiment 3 of the present invention;

FIG. 9D is further another timing chart explaining the operation of the communication apparatus according to Embodiment 3 of the present invention;

FIG. 10 is a block diagram representing the configuration of a communication apparatus according to Embodiment 4 of the present invention;

FIG. 11 is a timing chart explaining the operation of the communication apparatus according to Embodiment 4 of the present invention; and FIG. 12 is a block diagram representing the configuration of an electric power converter according to Embodiment 5 of the present invention,

BEST MODE FOR CARRYING OUT THE INVENTION

Hereinafter, embodiments of the present invention will be explained in detail by use of the drawings. In each of the drawings, the same reference characters denote the same or similar constituent elements. In each of the drawings and the explanations therefor, the respective signals transmitted through a signal line or a signal terminal and through the corresponding signal line or the corresponding signal terminal, as the case may be, will be represented by the same reference characters. Moreover, for the sake of avoiding complexity, a signal line or a signal terminal may be referred to only as a signal.

Embodiment 1

Figure 1:
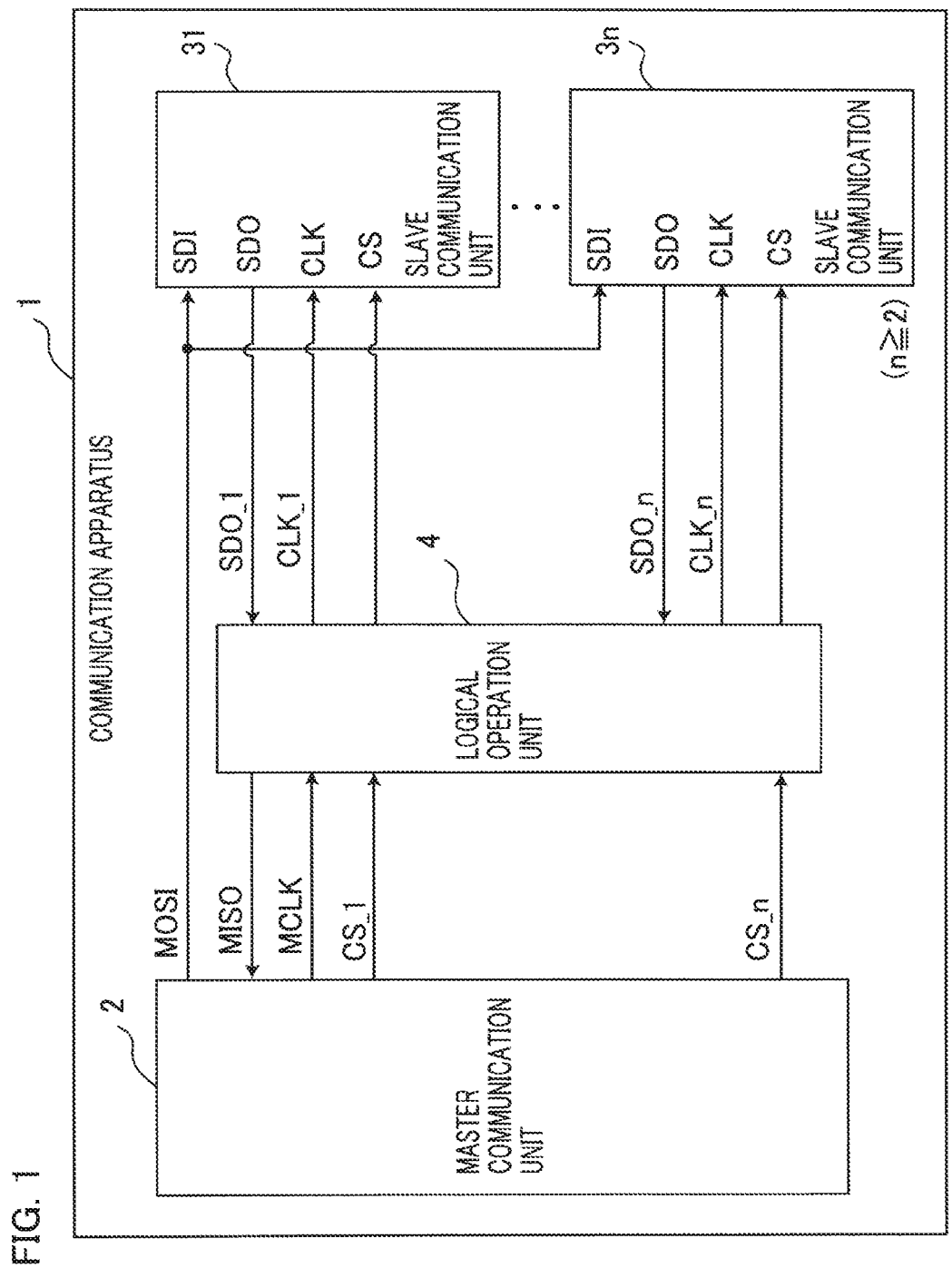
FIG. 1 is a block diagram representing the configuration of a communication apparatus according to Embodiment 1 of the present invention.

FIG. 1 is a block diagram representing the configuration of a communication apparatus according to Embodiment 1 of the present invention. As represented in FIG. 1, a communication apparatus 1 is provided with a master communication unit 2, two slave communication units 31 and 3n; the communication apparatus 1 further includes a logical operation unit 4 inserted into the communication path between the master communication unit 2 and the two or more slave communication units 31 and 3n.

The master communication unit 2 is provided with a data output signal line MOSI for transmitting a data output signal MOSI to the respective slave communication units 3, a data input signal line MISO for receiving a data input signal MISO from the logical operation unit 4, a synchronization clock signal line MCLK for transmitting a synchronization clock signal MCLK to the logical operation unit 4, and two slave selection signal lines CS_1 and CS_n for transmitting two—a number the same as the number of the slave communication units 31 and 3n, i.e., two—slave selection signals CS_1 and CS_n to the logical operation unit 4.

In contrast, the slave communication unit 31 has a data input signal line SDI for receiving the data output signal MOSI from the master communication unit 2, a data output signal line SDO for transmitting a data output signal SDO_1 to the logical operation unit 4, a synchronization clock signal line CLK for receiving a synchronization clock CLK_1 from the logical operation unit 4, and a slave selection signal line CS for receiving a slave selection signal CS from the logical operation unit 4; the slave communication unit 3n has a data input signal line SDI for receiving the data output signal MOSI from the master communication unit 2, a data output signal line SDO for transmitting a data output signal SDO_n to the logical operation unit 4, a synchronization clock signal line CLK for receiving a synchronization clock CLK_n from the logical operation unit 4, and a slave selection signal line CS for receiving a slave selection signal CS from the logical operation unit 4; the slave communication units 31 and 3n are connected with the master communication unit 2 by way of the communication path and the logical operation unit 4.

The logical operation unit 4 receives the synchronization clock signal MCLK and the two slave selection signals CS_1 and CS_n outputted by the master communication unit 2, and outputs the synchronization clock signal CLK_1 and the slave selection signal CS to the slave communication unit 3 and outputs the synchronization clock signal CLK_n and the slave selection signal CS to the slave communication unit 3n. The logical operation unit 4 receives the data output signals SDO_1 and SDO_n outputted by the slave communication units 3 and 3n, respectively, and transmits the data input signal MISO to the master communication unit 2.

Figure 2:
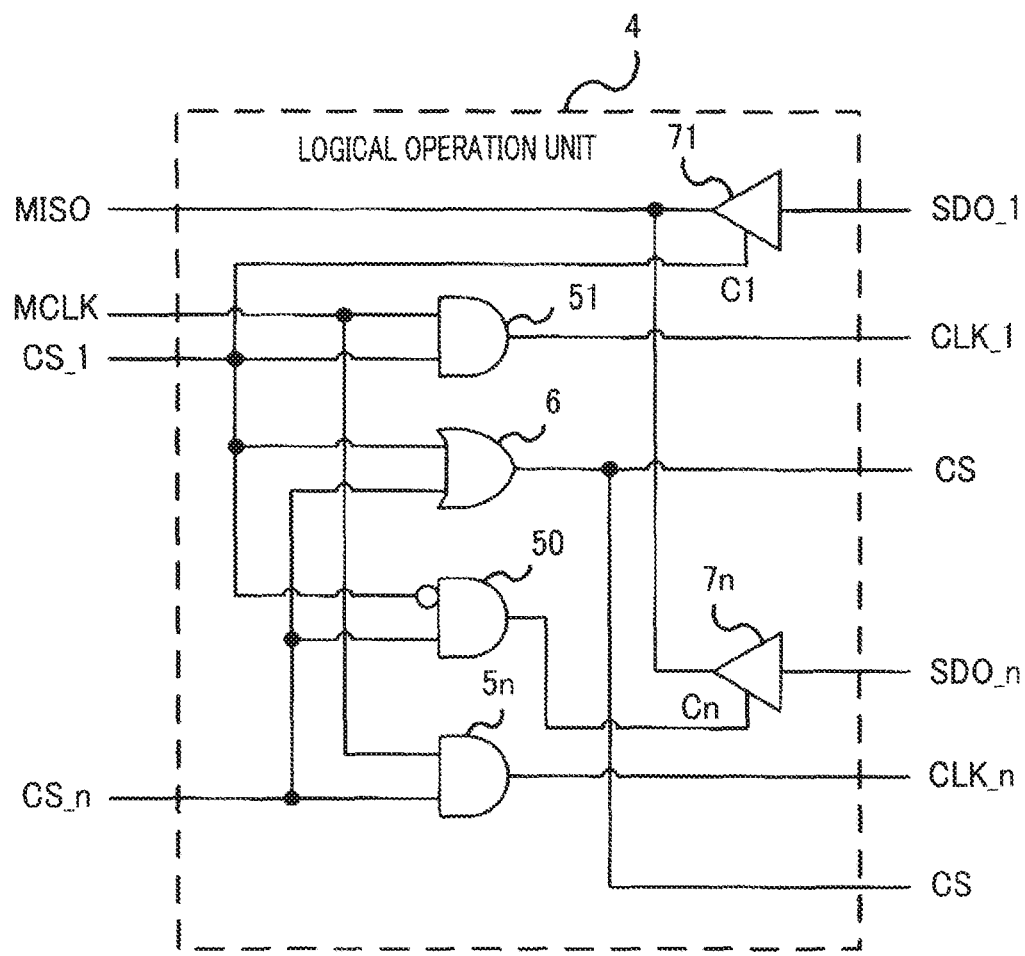
FIG. 2 is a circuit diagram representing an example of logical operation unit in the communication apparatus according to Embodiment 1 of the present. invention.

As a specific circuit configuration of the logical operation unit 4, the circuit configuration represented in FIG. 2 is conceivable when, for example, the high levels of the slave selection signals CS_1 and CS_n are significant. Because to date, various kinds of circuits related to serial communication and SPI communication have been proposed or realized and those technologies can be utilized, the explanations for the specific circuit configurations of the master communication unit L and the slave communication units 31 and 3n will be omitted here.

FIG. 2 is a circuit diagram representing an example of logical operation unit in the communication apparatus according to Embodiment 1 of the present invention. As represented in FIG. 2, the logical operation unit 4 is provided with two AND circuits 5 that each receive the synchronization clock signal MCLK and the slave selection signal CS_1 or CS_n that are outputted by the master communication unit 2; the synchronization clock signals CLK_1 and CLK_n, which are the outputs thereof are outputted to the respective synchronization clock signal lines CLK of the slave communication units 31 and 3*n*. In addition, the logical operation unit 4 is provided with an OR circuit 6 that receives the slave selection signals CS_1 and CS_n outputted by the master communication unit 2; the slave selection signal CS, which is the output thereof, ramifies and are outputted to the respective slave selection signal lines CS of the slave communication units 31 and 3*n*.

Meanwhile, the logical operation unit 4 is provided with two 3-state buffers 71 and 7*n* that receive the data output signals SDO_1 and SDO_n. outputted by the slave communication units 31 and 3*n*, respectively; the respective outputs of the 3-state buffers 71 and 7*n* are connected with each other and then connected with the data input signal MISO of the master communication unit 2.

In this situation, in the logical operation unit 4, control signals C1 and Cn for switching the outputs of the 3-state buffers 71 and 7*n*, respectively, to an high impedance conform to preliminarily determined respective communication priorities of the two slave communication units 31 and 3*n*, and logical operation processing is performed by use of the slave selection signals CS_1 and CS_n. For example, in FIG. 2, the slave selection signal CS_1 is set to the highest-priority slave selection signal, and the slave selection signal CS_1 is connected with the control signal C1 for the 3-state buffer 71 that receives the data output sign SDO_1 of the slave communication unit 31 corresponding to the slave selection signal CS_1. Then, the output signal Cn of an AND circuit 50 that receives a signal obtained by inverting the signal level of the slave selection signal CS_1 and the slave selection signal CS_n is connected with the other 3-state buffer 7*n*.

Figure 3:
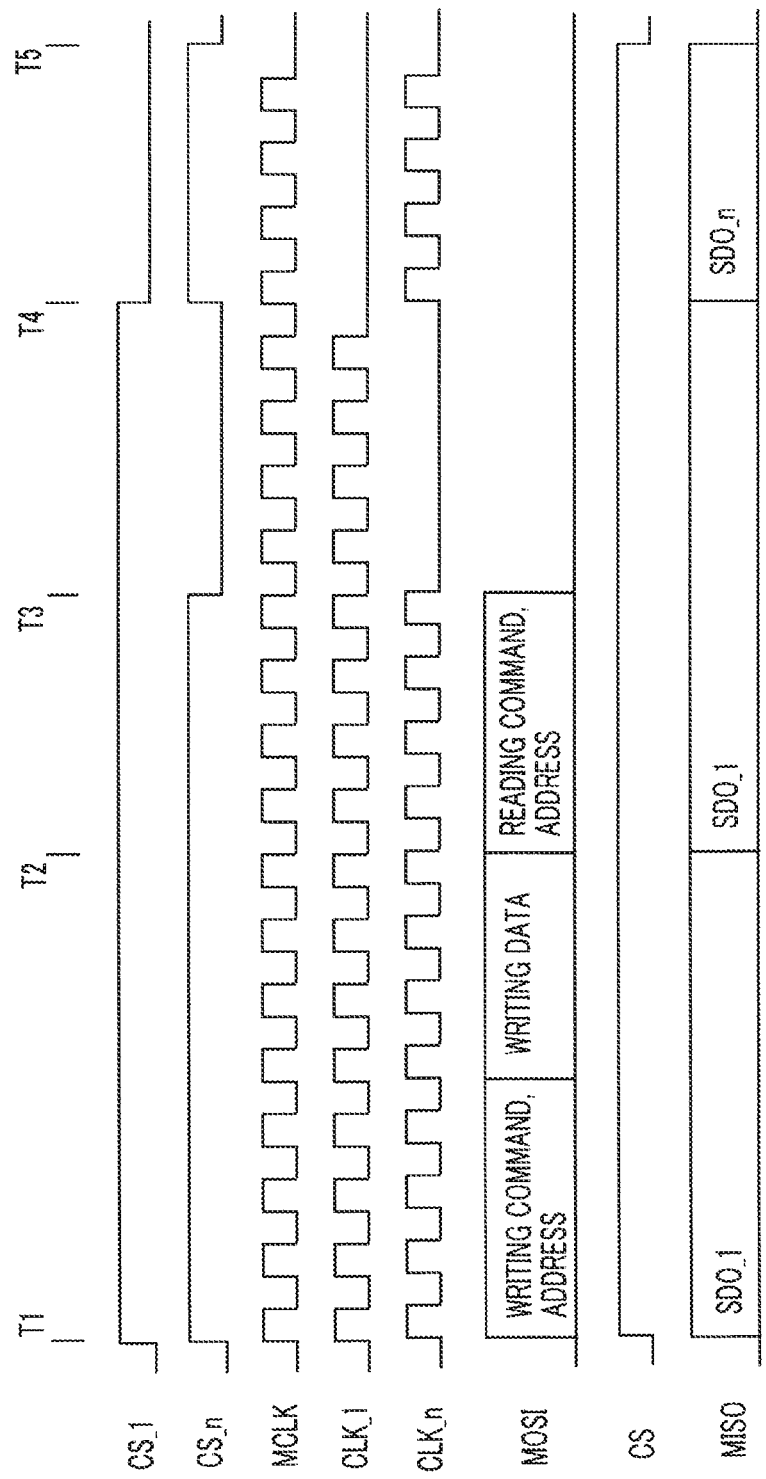
FIG. 3 is a timing chart explaining the operation of the communication apparatus according to Embodiment 1 of the present invention.

Next, the operation of the communication apparatus 1 according to Embodiment 1 of the present invention will be explained, FIG. 3 is a timing chart explaining the operation of the communication apparatus according to Embodiment 1 of the present invention; the abscissa denotes the time, and the ordinate denotes the slave selection signals CS_1 and CS_n from the master communication unit 2, the synchronization clock signal. MCLK from the master communication unit 2, the synchronization clocks CLK_1 and CLK_n from the logical operation unit 4, the data output signal MOST. from the master communication unit 2, the slave selection signal CS from the logical operation unit 4, and the data input signal MISO from the logical operation unit 4.

At the time point T1 in FIG. 3, the master communication unit 2, firstly, sets all the slave selection signals CS_1 and CS_n to the high level, which is significant, and outputs the synchronization clock signal MCLK and the data output signal MOSI.

Because all the slave selection signals CS_1 and CS_n are significant, the logical operation unit 4 sets the slave selection signals CS for the slave communication unit 3 to "significant" and outputs the synchronization clock signal MCLK, outputted from the master communication unit 2, directly and simultaneously to all the slave communication units 31 and 3*n*.

In the time period between the time point T1 and the time point T2 in FIG. 3, the data output signal MOST of the master communication unit 2 is outputted as a writing command and address data for implementing the writing command and then is outputted as writing data. In this time period, the slave communication units 3 output the data output signals SDO_1 and SDO_n with respective data pieces, indicating the states of failures or the like in the slave communication units 31 and 3*n*, that are superimposed on the data output signals SDO_1 and SDO_n, respectively; thus, with regard to the data output signals SDO_1 and SDO_n, the logical operation unit 4 selects only the data on the slave communication unit 31 corresponding to the highest-priority slave selection signal CS_1 and outputs the data, as the data input signal MISO, to the master communication unit 2. For example, in the circuit configuration of the logical operation unit 4 represented in FIG. 2, the data output signal SDO_1 is selected and is connected with the data input signal MISO.

In the time period between the time point T2 and the time point T3 in FIG. 3, the data output signal MOSI of the master communication unit 2 is outputted as a reading command and address data or implementing the reading command; as is the case with the foregoing time period between the time point T1 and the time point T2, only the data output signal SDO_1 of the slave communication unit 31 corresponding to the highest-priority slave selection signal CS_1 is selected and connected with the data input signal MISO of the master communication unit 2 in the logical operation unit 4.

At the time point T3 in FIG. 3, in order to continuously and separately read the data output signals SDO_1 and SDO_n of the respective slave communication units 3, the master communication unit 2 sets only the slave selection signal CS_1 for the data desired to be read to "significant" and sets the other slave selection signal CS_n "insignificant". Concurrently, the data output signal MOSI of the master communication unit 2 becomes a low-level or high-level fixed output. of a predetermined data-bit length (in the example represented in FIG. 3, the data output signal MOSI becomes a low-level fixed output.)

In the time period between the time point T3 and the time point T4 in FIG. 3, the logical operation unit 4 keeps the slave selection signals CS for all the slave communication units 31 and 3*n*"significant" and continuously outputs the synchronization clock signal CLK_1 only to the slave communication units 31 corresponding to the slave selection signal CS_1 that has been set to "Significant" by the master communication unit 2; the logical operation unit 4 stops the synchronization clock signal CLK_n from being outputted to the slave communication unit 3*n* corresponding to the slave selection signal CS_n that has been set to "insignificant", i.e. , the logical operation unit 4 fixes the synchronization clock signal CLK_n to the high level or the low level (in the example represented in FIG. 3, the synchronization clock signal CLK_n becomes the low-level fixed output)

The logical operation unit 4 sets the output of the 3-state buffer 7*n* corresponding to the slave selection signal CS_n that has been set to "insignificant" to a high impedance, and connects the data output signal SDO_1 outputted by the slave communication unit 31 with the data input signal MISO of the master communication unit 2, by way of the 3-state buffer 71 corresponding to the slave selection signal CS_1 that has been set to "significant".

Next, at the time, point T4 in FIG. 3, the logical operation unit 4 sets the slave selection signal CS_1 that has been set to "significant" by the master communication unit 2 to "insignificant", and switches the slave selection signal CS_n that has been set to "insignificant" to "significant" Then, in the time period between the time point T4 and the time point T5 in FIG. 3, the logical operation unit 4 keeps the slave selection signals CS for all the slave communication units 31 and 3*n*"significant" and continuously outputs the synchronization clock signal CLK_n only to the slave communication units 3*n* corresponding to the slave selection signal CS_n that has been set to "significant" by the master communication unit 2; the logical operation unit 4 stops the synchronization clock signal CLK_1 from being outputted to the slave communication unit 31 corresponding to the slave selection signal CS_1 that has been set to "insignificant", i.e., the logical operation unit 4 fixes the synchronization clock signal CLK_1 to the high level or the low level (in the example represented in FIG. 3, the synchronization clock signal CLK 1 becomes the low-level fixed output).

Then, the logical operation unit 4 sets the output of the 3-state buffer 71 corresponding to the slave selection signal CS_1 that has been set to "insignificant" to the high impedance, and connects the data output signal SDO_n outputted by the slave communication unit 3 with the data input signal MISO of the master communication unit 2, by way of the 3-state buffer 7n corresponding to the slave selection signal CS_n that has been set to "significant".

In FIG. 3, there has been explained the case where the same data is simultaneously written in all the slave communication units 31 and 3n; however, the communication apparatus according to the present invention is not limited thereto. Even in the case where the data pieces differ from one another, the operation can be performed in the same manner as in the case of foregoing data reading, which starts at the time point T2 in FIG. 3. In other words, while setting all the slave selection signals CS_1 and CS_n to "significant", the master communication unit 2 outputs only the writing command out of the data output signal MOSI to all the slave communication units 31 and 3n; then, the master communication unit 2 selects the slave communication unit that performs communication in accordance with the slave selection signal and outputs respective different data pieces to the slave communication units 31 and 3n. Then, in accordance with the slave selection signals of the master communication unit 2, the logical operation unit 4 outputs the synchronization clock signals separately to the slave communication units 31 and 3n; thus, respective different data pieces can continuously be written in the slave communication units 31 and 3n.

As described above, in the communication apparatus according to Embodiment 1 of the present invention, because the master communication unit 2 sets all the slave selection signals to "significant" and outputs the synchronization clock signal MCLK and the data output signal MOSI, the writing command, the writing data, and the reading command can simultaneously be outputted to all the slave communication units 31 and 3n; thus, because the communication time can be shortened, which makes it possible that even a low-processing-ability circuit configuration performs communication processing, the cost can be reduced and the differences in the respective post-communication operation timings of the slaves can also be decreased.

Moreover, because the master communication unit 2 simultaneously outputs the writing command or the reading command to all the slave communication units 31 and 3n and then sets only the slave selection signal for the slave communication unit that performs communication to "significant", the synchronization clock signal is outputted by way of the logical operation unit 4 only to the slave communication unit that performs communication; therefore, it is made possible to continuously write respective different data pieces to the slave communication units 3 or to continuously read respective data pieces from the slave communication units 3.

Furthermore, because in the case where any one of the slave selection signals is significant, the logical operation unit 4 continuously sets the respective slave selection signals CS for the slave communication units 31 and 3n to "significant", each of the slave communication units 31 and 3n can maintain the contents of the command from the master communication. unit 2 even while, as described above, respective data pieces are continuously written in or read from the slave communication units 31 and 3n. Accordingly, the command for each of the slave communication units 31 and 3n is required only once and hence the communication time can be shortened, i.e., the communication efficiency can be raised.

Although with regard to the communication apparatus according to Embodiment 1 of the present invention, the case where there exist two slave communication units has been described, the present invention is not limited thereto; it may be allowed that there exist three or more slave communication units. In that case, the number of the slave selection signals of the master communication unit 2 and the circuit configuration of the logical operation unit 4 are changed in accordance with the number of the slave communication units, so that the operation and effect the same as those in the foregoing case can be obtained.

Embodiment 2

Figure 4:
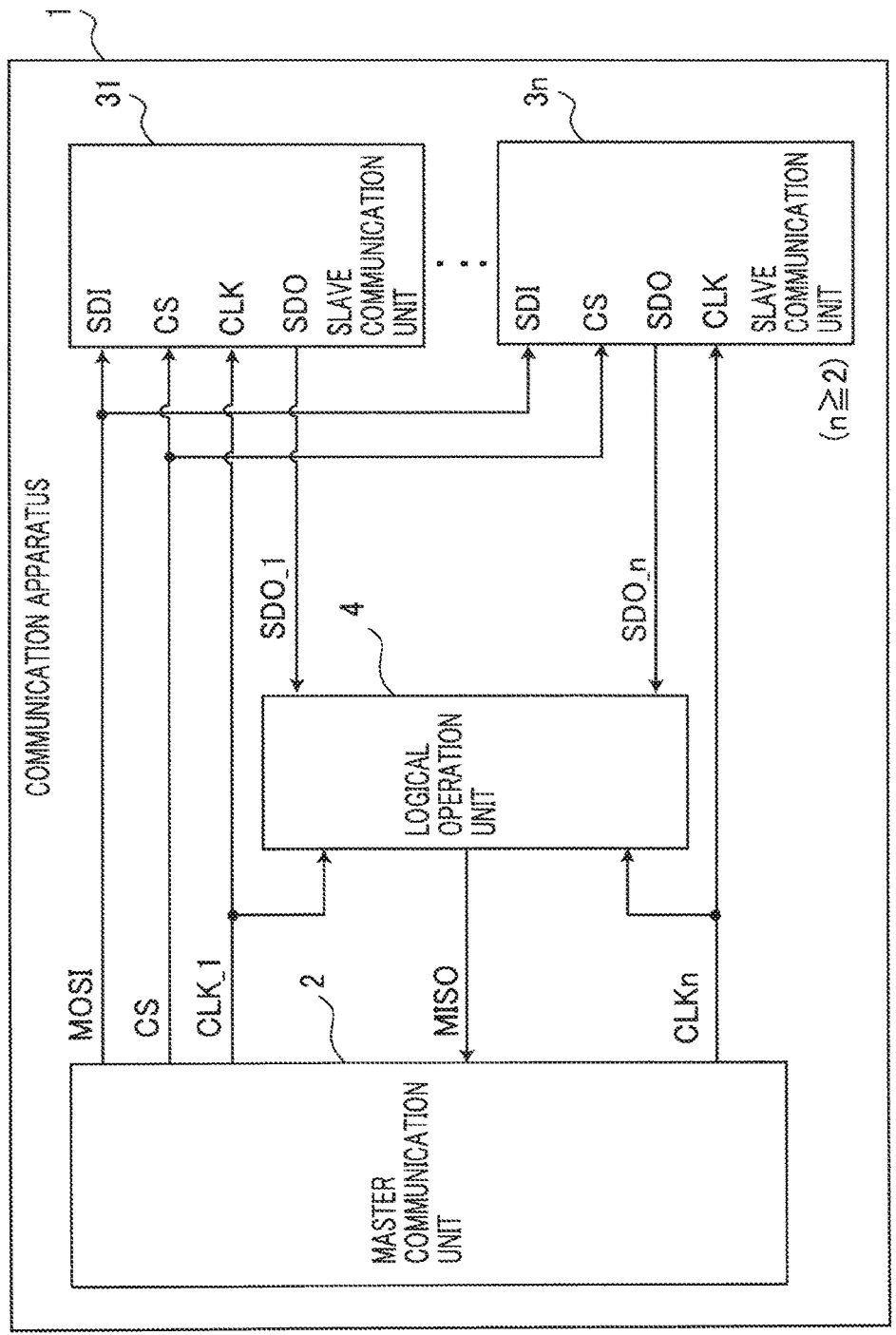

Next, a communication apparatus according to Embodiment 2 of the present invention will be explained. FIG. 4 is a block diagram representing the configuration of a communication apparatus according to Embodiment 2 of the present invention. In comparison with the communication apparatus, represented in FIG. 1, according to Embodiment 1 of the present invention, the master communication unit 2 in the communication apparatus, represented in FIG. 4, according to Embodiment 2 has only one slave selection signal line CS for transmitting the slave selection signal CS; the slave selection signal line CS is directly connected with the respective slave selection signal lines CS of the slave communication units 31 and 3n, without passing through the logical operation unit 4. The data output signal MOSI from the master communication unit 2 is inputted to the respective data input signal lines SDI of the slave communication units 31 and 3n.

The master communication unit 2 is provided with two—a number the same as the number of the slave communication units 31 and 3n, i.e., two—synchronization clock signal lines CLK_1 and CLK_n; each of the synchronization clock signal lines CLK_1 and CLK_n ramifies and is connected with the logical operation unit 4 and the slave communication unit 3.

The logical operation unit 4 receives the two synchronization clock signals CLK_1 and CLK_n outputted by the master communication unit 2 and the data output signals SDO outputted by the slave communication units 31 and 3n, performs a logic operation, and then outputs the result of the logic operation to the data input signal line MISO of the master communication unit 2. As a specific circuit configuration of the logical operation unit 4, for example, the circuit configuration represented in FIG. 5 is conceivable.

That is to say, FIG. 5 is a circuit diagram representing an example of logical operation unit in the communication apparatus according to Embodiment 2 of the present invention. As represented in FIG. 5, the logical operation unit 4 is provided with an XOR circuit 8 that receives the two synchronization clock signals CLK_1 and CLK_n outputted by the master communication unit 2 and two AND circuits 51 and 5n that each receives the output of the XOR circuit 8 and either one of the synchronization clock signals CLK_1 and CLK_n. Then, the outputs of the AND circuits 51 and 5n are inputted, as the respective set signals S, to two RS latch circuits 91 and 9*n*. There is provided an NCR circuit 10 that receives the respective outputs Q of the RS latch circuits 91 and 9*n* and the output of the XOR circuit 8.

Moreover, there are provided two CR circuits 61 and 6*n* that each receives the output of the NCR circuit 10 and the output Q of either one of the RS latch circuits 91 and 9*n*. Then, as represented in FIG. 2, through logical operation processing for preventing interference from the data output signals SDO outputted from the slave communication units 31 and 3*n*, the outputs of the CR circuits 61 and 6*n* are inputted, as the respective control signals, to the 3-state buffers 71 and 7*n* that receive the respective data output signals of the slave communication units 31 and 3*n*. As is the case in FIG. 2, the outputs of the 3-state buffers 71 and 7*n* are connected with each other and then are connected with the data input signal line MISO of the master communication unit 2.

Each of the OR circuits 61 and 6*n*, the RS latch circuits 91 and 9*n*, and the AND circuits 51 and 5*n* is a logical operation circuit corresponding to either one of the slave communication units 31 and 3*n* to which the respective corresponding synchronization clock signals CLK_1 and CLK_n to be inputted thereto are connected; the outputs of the OR circuits 61 and 6*n* are connected with the respective 3-state buffers 71 and 7*n* that receive the data output signals SDO_1 and SDO_n of the corresponding slave communication units 31 and 3*n*.

The logical operation processing is configured in such a way that for example, the slave communication unit 31 to which the synchronization clock signal CLK_1 is inputted is set to the highest-priority slave communication unit and for the data output signal SDO_1 thereof, the output of the OR circuit 61 is directly inputted, as the control signal C1, to the 3-state buffer 71 and in such a way that for the data output signal SDO_n of the low-priority slave communication unit 3*n*, the output of an AND circuit 50, which receives a signal obtained by inverting the signal level of the output of the NOR circuit 10 and the output of the OR circuit 6, is connected, as the control signal Cn, with the 3-state buffer 7*n*.

Meanwhile, the logical operation unit 4 represented in FIG. 5 is provided with counter circuits 111 and 11*n* that each count a predetermined data bit length, based on. the respective synchronization clock signals CLK_1 and CLK_n; the number of the counter circuits 111 and 11*n* is the same as the number of the slave communication units 31 and 3*n*. After counting the predetermined data bit length, each of the counter circuits 111 and 11*n* sets the signal level to "significant" and outputs the signal. The signals outputted from the counter circuits 111 and 11*n* undergo delaying processing and then inputted, as reset signals R, to the RS latch circuits 91 and 9*n* corresponding to the synchronization clock signals CLK_1 and CLK_n, respectively. The output signal Q of the RS latch circuit 91 or 9*n* is inputted to the NOR circuit 10 and the OR circuit 61 or 6*n* and is inputted, as a reset signal CLR, to the counter circuit 111 or 11*n*, as the case may be.

Next, the operation of the communication apparatus 1 according to Embodiment 2 of the present invention will be explained. FIG. 6 is a timing chart explaining the operation of the communication apparatus according to Embodiment 2 of the present invention; the abscissa denotes the time, and the ordinate denotes the slave selection signal CS from the master communication unit 2, the synchronization clock signals CLK_1 and CLK_n from the master communication unit 2, the control signal Cl from the OR circuit 61, the control signal Cn from the AND circuit 50, the data output signal MOSI from the master communication unit 2, and the data input signal MISO from the logical operation unit 4.

At the time point T1 in FIG. 6, the master communication unit 2, firstly, sets the slave selection signal CS to the high level, which is significant, outputs the synchronization clock signals CLK_1 and CLK_n. that have one and the same signal level and are synchronized with each other, and outputs the data output signal MOSI to the respective slave communication units 31 and 3*n*. The foregoing operation makes it possible to output the writing command and the writing data simultaneously to all the slave communication units 31 and 3*n*, as is the case with Embodiment 1, described above.

In the time period between the time point T1 and the time point T2 in FIG. 6, the output of the XOR circuit 8 is low-level and the respective outputs of the RS latch circuits 91 and 9*n* are also low-level in the logical operation unit 4; therefore, the respective reset signals CLE for the counter circuits 111 and 11*n* are set to "significant" and hence the counter circuits 111 and 11*n* do not perform counting operation. Because all the input signals for the NOR circuit 10 are low-level, the output thereof is set to the high level, and the respective outputs of the OR circuits 61 and 6*n* in the poststage thereof are also set to the high level. Furthermore, through the foregoing interference prevention circuit in the poststage of the OR circuits 61 and 6*n*, only the data output signal SDO_1 of the highest-priority slave communication unit 31 is selected; then, the 3-state buffers 71 and 7*n* are controlled so that the selected data output signal SDO_1 is outputted to the data input signal MISO of the master communication unit 2.

Next, in the time period between the time point T2 and the time point T3 in FIG. 6, the data output signal MOST of the master communication unit 2 is outputted as a reading command and address data for implementing the reading command; as is the case with the foregoing time period between the time point T1 and the time point T2, only the data of the slave communication unit 31 corresponding to the highest-priority slave selection signal SDO_1 is selected and outputted to the data input signal MISO of the master communication unit 2 in the logical operation unit 4.

Then, at the time point T3 in FIG. 6, in order to continuously and separately read the data output signals SDO_1 and SDO_n of the respective slave communication units 31 and 3*n*, the master communication unit 2 outputs only the synchronization clock signal CLK_1 for the slave communication unit 31 whose data is desired to be read and stops the other synchronization clock signal CLK_n from being outputted, i.e., fixes the other synchronization clock signal CLK_n to the low level. Concurrently, the data output signal MOSI of the master communication unit 2 is set to a low-level or high-level fixed output of a predetermined data-bit length (in the example represented in FIG. 6, the data output signal MOSI becomes a low-level fixed output.)

In the logical operation unit 4, in the time period between the time point T3 and the time point T4 in FIG. 6, the synchronization clock signal CLK_1 is inputted, as the set signal S, to the RS latch circuit 91 for the synchronization clock signal CLK_1 outputted by the master communication unit 2, and hence the output signal Q of the RS latch circuit 91 is set to the high level; thus, the reset signal CLR for the counter circuit 111 connected with the output signal Q is set to "insignificant" and hence the counter circuit 111 is synchronized with the synchronization clock signal CLK_1 and starts counting. In addition, because the output signal Q of the counter circuit 111 is set to the high level, the output of the NCR circuit 10 becomes low-level.

In contrast, with regard to the RS latch circuit 9*n* corresponding to the synchronization clock signal CLK_n that is stopped from being outputted by the master communication unit 2, i.e., fixed to the low level, the output signal Q thereof also becomes low-level and hence the reset signal CLR for the corresponding counter circuit 11*n* is set to "significant"; therefore, the counter circuit 11*n* does not perform counting operation, Then, the control signal C1 for the 3-state buffer 71 is set to "significant" through the OR circuit 61 corresponding to the RS latch circuit 91 whose output is set to the high level, and hence the data output signal SDO_1 of the slave communication unit 31 is outputted to the data input signal MISO of the master communication unit 2.

In the logical operation unit 4, after the counter circuits 111 and 11*n* each count a predetermined data bit length, the respective reset signals R for the RS latch circuits 91 and 9*n* are set to "significant" so as to release the latches and the respective reset signals (CLR) for the counter circuits 111 and 11*n* are set to "significant"; thus, no latch-up occurs in any of the RS latch circuits 91 and 9*n* and hence it is made possible that through after-mentioned switching of the synchronization clock signals, the data output signals, of the slave communication units 31 and 3*n*, that are outputted to the master communication unit 2 are appropriately selected in accordance with the synchronization clock signal.

In the logical operation unit 4, delay circuits Delay_1 and Delay_n provided between the counter circuits 111 and 11*n* and the respective reset signals R of the RS latch circuits 91 and 9*n* each have the objective of preventing the set signal S and the reset signal R of each of the RS latch circuits 91 and 9*n* from concurrently becoming high-level thereby making the respective outputs of the RS latch circuits 91 and 9*n* unstable; the delay times of the delay circuits Delay_1 and Delay_n can be set, for example, based on the respective propagation times of the signals. Alternatively, taking it into consideration that the master communication unit 2 reads data at the respective falling edges of the synchronization clock signals CLK_1 and CLK_n, the delay time may be set to a time corresponding to the half of each of the periods of the synchronization clock signals CLK_1 and CLK_n.

At the time point T4 in FIG. 5, because the master communication unit 2 switches the synchronization clock signals so that the same operation is repeated, the data output signal SDO_n of the slave communication unit 3*n* is inputted, as the data input signal MISO, to the master communication unit 2 through the logical operation processing in the logical operation unit 4.

Although in FIG. 6, there has been explained the case where the same data is written simultaneously in all the slave communication units 31 and 3*n*, the present invention is not limited thereto; even in the case where the data pieces differ from one another, the operation can be performed in the same manner as in the case of foregoing data reading, which starts at the time point T2 in FIG. 6. In other words, the master communication unit 2 outputs the synchronization clock signals CLK_1 and CLK_n with the same signal level; after outputting only the writing command out of the data output signal MOSI simultaneously to all the slave communication units 3, the master communication unit 2 outputs only the synchronization clock signals connected with the slave communication units 31 and 3*n* with which communication is desired to be performed and then outputs respective different data pieces to the slave communication units 31 and 3*n*. Because in accordance with the synchronization clock signal of the master communication unit 2, the logical operation unit 4 outputs only the data output signal SDO of the slave communication units 3 with which communication is performed to the data input signal MISO of the master communication unit 2, the respective data output signals SDO of the slave communication units 3 do not interfere with one another; thus, while writing data in the slave communication units 31 and 3*n* with which communication is performed, the master communication unit 2 can read data indicating the state of a failure or the like.

As described above, in the communication apparatus according to Embodiment 2 of the present invention, because the master communication unit 2 sets the slave selection signal CS to "significant", outputs the synchronization clock signals CLK_1 and CLK_n with the same signal level, and outputs the data output signal MOSI, the writing command, the writing data, and the reading command can simultaneously be outputted to all the slave communication units 31 and 3*n*; thus, because the communication time can be shortened, which makes it possible that even a low-processing-ability circuit configuration performs communication processing, the cost can be reduced and the differences in the respective post-communication operation timings of the slaves can also be decreased.

Moreover, because after simultaneously outputting the writing command to all the slave communication units 31 and 3*n*, the master communication unit 2 outputs the synchronization clock signal only to the slave communication unit with which communication is performed and outputs the writing data through the data output signal MOSI; thus, the command for each of the slave communication units 31 and 3*n* is required only once and hence the communication time can be shortened, i.e., the communication efficiency can be raised.

Still moreover, while the master communication unit 2 outputs the writing command, the writing data, and reading command simultaneously to all the slave communication units 31 and 3*n*, the logical operation unit 4 outputs to the master communication unit 2 only the data output signal SDO of the highest-priority slave communication unit, among the respective data output signals SDO outputted from the slave communication units 31 and 3*n*; therefore, interference among the respective data output signals SDO can be prevented.

Furthermore, based on the synchronization clock signal that is outputted by the master communication unit 2 only to the slave communication unit whose data is desired to be read, the logical operation unit 4 performs logical operation processing in such a way as to output the data output signal SDO of a predetermined data bit length, outputted from the slave communication unit 3 for which the synchronization clock signal is outputted, to the data input signal MISO of the master communication unit 2; therefore, it is made possible to continuously read the respective data pieces from the slave communication units 31 and 3*n*.

Although with regard to the communication apparatus according to Embodiment 2 of the present invention, the case where there exist two slave communication units has been described, the present invention is not limited thereto; it may be allowed that there exist three or more slave communication units. In that case, the number of the synchronization clock signals of the master communication unit 2 and the circuit configuration of the logical operation unit 4 are changed in accordance with the number of the slave communication units, so that the operation and effect the same as those in the foregoing case can be obtained.

Embodiment 3

Next, a communication apparatus according to Embodiment 3 of the present invention will be explained. FIG. 7 is a block diagram representing the configuration of a communication apparatus according to Embodiment 3 of the present invention. In comparison with the communication apparatus, represented in FIG. 1, according to Embodiment 1, the master communication unit 2 in the communication apparatus, represented in FIG. 7, according to Embodiment 3 has only one slave selection signal CS; the slave selection signal CS ramifies and is directly connected with the logical operation unit 4 and the respective slave selection signals CS of the slave communication units 31 and 3n.

The master communication unit 2 is provided with two—a number the same as the number of the slave communication. units 31 and 3n, i.e., two—data output signal lines MOSI_1 and MOSI_n; each of the data output signal lines MOSI_1 and MOSI_n ramifies and is connected with the logical operation unit 4 and either one of the slave communication units 31 and 3n.

The logical operation unit 4 receives all the signals outputted by the master communication unit 2 and the slave communication units 31 and 3n, performs a logic operation, and then outputs the respective synchronization clock signals for the slave communication units 31 and 3n and the data input signal MISO of the master communication unit 2. As a specific circuit configuration of the logical operation unit 4, for example, the circuit configuration represented in FIG. 8, is conceivable.

That is to say, FIG. 8 is a circuit diagram representing an example of logical operation unit in the communication apparatus according to Embodiment 3 of the present invention. As represented in FIG. 8, the logical operation unit 4 is provided with three counter circuits, i.e., a first counter circuit 12, a second counter circuit 13, and a third counter circuit 14. The first counter circuit 12 has an objective of counting the synchronization clock signal MCLK outputted by the master communication unit 2 so as to measure the turning points of the reading command or the writing command of a predetermined bit length; at the timing when the output of the reading command signal or the writing command signal ends, the first counter circuit 12 outputs a latch signal SF for latching the command signal at a high level, which is significant, and a latch signal NSF for latching the command signal at a low level.

In addition, the first counter circuit 12 has a circuit that extracts the signal level of a predetermined-position bit of the command signal and determines whether the extracted command signal is the reading command signal or the writing command signal; in the example represented in FIG. 8, in the case where the predetermined-position bit (the 7th bit) of each of the command signals is high-level, the first counter circuit 12 determines that the command is the writing command, latches the high-level signal, and then outputs command detection outputs CMOSI_1 and CMOSI_n to the other circuits in the logical operation unit 4. When the slave selection signal CS is insignificant, the first counter circuit 12 resets counting of the synchronization clock signal MCLK and releases the latch signal SF and latching of the command detection outputs CMOSI_1 and CMOSI_n at the high level.

The second counter circuit 13 has an objective of counting the synchronization clock signal MCLK outputted by the master communication unit 2 so as to measure the turning points of the data output signal of a predetermined bit length; in response to the latch signal SF that outputted by the first counter circuit 12 at the timing when the output of the command signal ends, the reset is cancelled and the counting operation is started.

The third counter circuit 14 has an objective of counting pulse signals that are outputted by the second counter circuit 13 at the turning points of the data output signal so as to measure the number of the data output. signals outputted by the master communication unit 2 and can perform the counting up to the number of the slave communication units 31 and 3n; the third counter circuit 14 outputs the counted number, as a data number count signal DCnt, to the other circuits in the logical operation unit 4. In addition, when the slave selection signal CS is insignificant, the third counter circuit 14 resets the count of the pulse signals.

Meanwhile, in the logical operation unit 4, the data output signals SDO_1 and SDO_n are inputted to the 3-state buffers 71 and 7n, respectively; the respective outputs of the 3-state buffers 71 and 7n are connected with each other and then connected with the data output signal MISO of the master communication unit 2.

In this situation, the control signals Cl and Cn switch the outputs of the 3-state buffers 71 and 7n to the high impedance in such a way as to prioritize the preliminarily determined communication priorities of the slave communication units 31 and 3n and the slave communication unit for which the writing command is outputted; the logical operation unit 4 performs a logic operation by use of the command detection outputs CMOSI_1 and CMOSI_n outputted by the first counter circuit 12 and the data number count signal DCnt outputted by the third counter circuit 14. For example, in FIG. 8, the data output signal SDO_1 of the slave communication unit 31 is prioritized.

Moreover, in order to separately and continuously output the data output signals SDO_1 and SDO_n, outputted by the slave communication units 31 and 3n, to the master communication unit 2, the logical operation unit 4 configures a logical operation circuit for performing a logic operation, by use of the command detection outputs CMOSI_1 and CMOSI_n and the latch signal NSF that are outputted by the first counter circuit 12, the control signals C1 and Cn for the 3-state buffers 71 and 7n, and the synchronization clock s of MCLK of the master communication unit 2, and generates the synchronization clock signals CLK_1 and CLK_n for the slave communication units 31 and 3n.

For example, in FIG. 8, in the time period in which the master communication unit 2 outputs the reading command signal or the writing command signal, the synchronization clock signals CLK_1 and CLK_n are outputted to all the slave communication units 31 and 3n. In the case of the writing command, in the time period in which after outputting the writing command signal, the master communication unit 2 outputs the data, the synchronization clock signals are outputted to the corresponding slave communication units 31 and 3n. In contrast, in the case of the reading command, the synchronization clock signals are outputted in order of the preliminarily determined communication priority so that the master communication unit 2 can separately and continuously read the data output signals outputted by the slave communication units 31 and 3n.

Next, the operation of the communication apparatus 1 according to Embodiment 3 of the present invention will be explained by use of a timing chart. FIG. 9A is a timing chart explaining the operation of the communication apparatus according to Embodiment 3 of the present invention; FIG. 9B is another timing chart explaining the operation of the communication apparatus according to Embodiment 3 of the present invention; FIG. 9C is further another timing chart explaining the operation of the communication apparatus according to Embodiment 3 of the present invention; FIG. 9D is further another timing chart explaining the operation of the communication apparatus according to Embodiment 3 of the present invention. In each of these drawings, the abscissa denotes the time, and the ordinate denotes the slave selection signal CS from the master communication unit 2, the synchronization clock signal MCLK from the master communication unit 2, the synchronization clock signals CLK_1 and CLK_n from the logical operation unit, the data output signals MOSI_1 and MOSI_n from the master communication unit 2, the command detection signals CMOSI_1 and CMOSI_n from the first counter circuit 12, the latch signal SF from the first counter circuit 12, the data number count signal DCnt from the third counter circuit 14, the control signal C1 from the OR circuit 6, the control signal Cn from the AND circuit 5, and the data input signal MISO from the logical operation unit 4.

At the time point T1 in FIG. 9A, the master communication unit 2, firstly, sets the slave selection signal CS to the high level, which is significant, and outputs the synchronization clock signal MCLK and the reading command signal or the writing command signal to the respective data output signals MOSI_1 and MOSI_n.

In the time period between the time point T1 and the time point T2 in

FIG. 9A, each of the data output signals MOSI_1 and MOSI_n is the writing command; thus, in the logical operation unit 4, the first counter circuit 12 outputs high-level signals, as the respective command detection outputs CMOSI_1 and CMOSI_n so as to directly output the synchronization signal clocks outputted by the master communication unit 2, as the synchronization clock signals CLK_1 and CLK_n for the slave communication units 31 and 3n. The master communication unit 2 outputs the respective writing data pieces following the writing commands to the data output signals MOSI_1 and MOSI_n. At the time point T2, which is the last time point of the time period between the time point T1 and the time point T2, the master communication unit 2 sets the slave selection signal CS to the low level, which is insignificant, so as to end the communication. The foregoing operation makes it possible to output the writing command and the writing data simultaneously to all the slave communication units 31 and 3n, as is the case with Embodiment 1, described above.

In the time period between the time point T1 and the time point T2 in FIG. 9A, the data output signals MOSI_1 and MOSI_n are writing commands; thus, in the logical operation unit 4, the control signals C1 and Cn control the 3-state buffers 71 and 7n in such a way that the data output signal SDO_1 of a preliminarily determined high priority, out of the data output signals outputted by the slave communication units 31 and 3n, is selected; then, the selected data output signal SDO_1 is outputted to the data input. signal MISO of the master communication unit 2.

Next, in the time period between the time point T3 and the time point T4 in FIG. 9B, each of the data output signals MOSI_1 and MOSI_n outputted by the master communication unit 2 is the reading command. Accordingly the master communication unit 2, firstly, sets the slave selection signal CS to the high level, which is significant, and outputs the synchronization clock signal MCLK and the reading command to the data output signals MOSI_1 and MOSI_n.

Then, in the logical operation unit 4, the first counter circuit 12 detects the reading command and outputs low-level signals, as the command detection outputs CMOSI_1 and CMOSI_n so that firstly, for the slave communication unit 31 of a preliminarily determined high communication priority, the synchronization signal clock outputted by the master communication unit 2 is outputted to the synchronization clock signal CLK of the slave communication unit 31; then, for the slave communication unit 3n, the synchronization signal clock outputted by the master communication unit 2 is outputted to the synchronization clock signal CLK of the slave communication unit 3n. In the example in FIG. 9B, the priority of the synchronization clock signal CLK_1 outputted by the logical operation unit 4 is set to be high; thus, at first, the synchronization clock signal CLK_1 is outputted to the slave communication unit 31. In this situation, the control signals C1 and Cn control the 3-state buffers 71 and 7n in such a way that the data output signal SDO_1 of the slave communication unit 31 of a high priority is selected; then, the selected data output signal SDO_1 is outputted to the data input signal MISO of the master communication unit 2.

Then, the second counter circuit 13 counts the synchronization clock signal MCLK from the master communication unit 2 and outputs a pulse signal to the third counter circuit 14 in synchronization with the time point when a predetermined data bit length is outputted or the falling timing, thereafter, of the synchronization clock signal MCLK. As a result, the third counter circuit 14 counts up the data number count signal DCnt by one and hence the control signals for the 3-state buffers 71 and 7n and the synchronization clock signals are switched; then, the synchronization clock signal CLK_n of a low priority is outputted to the slave communication unit 3n, in turn, and control is performed in such a way that the data output signal SDO_n of the slave communication unit 3n of a low priority is selected, so that the selected data output signal SDO_n is outputted to the data input signal MISO of the master communication unit 2. At the time point T4, which is the last time point of the time period between the time point T3 and the time point T4, the master communication unit 2 sets the slave selection signal CS to the low level, which is insignificant, so as to end the communication. The foregoing operation makes it possible to output the writing command and the writing data simultaneously to all the slave communication units 31 and 3n, as is the case with Embodiment 1, described above.

In each of the time period between the time point T5 and the time point T6 in FIG. 9C and the time period between the time point T7 and the time point T8 in FIG. 9D, there is presented the case where any one of the data output signals MOSI_1 and MOSI_n outputted by the master communication unit 2 is the writing command. That is to say, in each of the time period between the time point T5 and the time point T6 in FIG. 9C and the time period between the time point T7 and the time point T8 in FIG. 9D, the master communication unit 2 sets the slave selection signal CS to the high level, which is significant, and outputs the synchronization clock signal MCLK and the reading command signal or the writing command signal to the respective data output signals MOSI_1 and MOSI_n.

Then, in the logical operation unit 4, the first counter circuit 12 detects the reading command or the writing command and outputs high-level signals or low-level signals, as the command detection outputs CMOSI_1 and CMOSI_n so that the writing command is set for the slave communication unit of a high communication priority; then, the synchronization signal clocks outputted by the master communication unit 2 are sequentially outputted to the synchronization clock signals of the slave communication units 31 and 3n.

In the time period between the time point T5 and the time point T6 in FIG. 9C, there is represented the case where the command detection output CMOSI_1 is the writing, command; the logical operation unit 4, firstly, outputs the corresponding synchronization clock signal CLK_1. In this situation, the control signals C1 and Cn control the 3-state buffers 71 and 7n in such a way that the data output signal SDO_1 of the slave communication unit 31 for which the writing command is issued is selected; then, the data output signal SDO_1 of the slave communication unit 31 is outputted to the data input signal MISO of the master communication unit 2.

Then, the second counter circuit 13 counts the synchronization clock signal MCLK from the master communication unit 2 and outputs a pulse signal to the third counter circuit 14 in synchronization with the time point when a predetermined data bit length is outputted or the falling timing, thereafter, of the synchronization clock signal. As a result, the third counter circuit 14 counts up the data number count signal DCnt by one and hence the control signals for the 3-state buffers 71 and 7n and the synchronization clock signals are switched; then, the synchronization clock signal CLK n for the slave communication unit 3n for which the reading command is outputted is outputted, in turn, and control is performed in such a way that the data output signal SDO_n of the slave communication unit 3n corresponding thereto is selected, so that the selected data output signal SDO_n is outputted to the data input signal MISO of the master communication unit 2. At the time point T6, which is the last time point. of the time period between the time point T5 and the time point T6, the master communication unit 2 sets the slave selection signal CS to the low level, which is insignificant, so as to end the communication.

In the time period between the time point T7 and the time point T8 in FIG. 9D, there is represented the case where the command detection output CMOSI_n is the writing command; the logical operation unit 4, firstly, outputs the corresponding synchronization clock signal CLK_n. In this situation, the control signals C1 and Cn control the 3-state buffers 71 and 7n in such a way that the data output signal SDO_n of the slave communication unit 3n for which the writing command is issued is selected; then, the data output signal SDO_n of the slave communication unit 3n is outputted to the data input signal MISO of the master communication unit 2.

Then, the second counter circuit 13 counts the synchronization clock signal MCLK from the master communication unit 2 and outputs a pulse signal to the third counter circuit 14 in synchronization with the time point when a predetermined data bit length is outputted or the falling timing, thereafter, of the synchronization clock signal. As a result, the third counter circuit 14 counts up the data number count signal DCnt by one and hence the control signals for the 3-state buffers 71 and 7n and the synchronization clock signals are switched; then, the synchronization clock signal CLK_1 for the slave communication unit 31 for which the reading command is outputted is outputted, in turn, and control is performed in such a way that the data output signal SDO_1 of the slave communication unit 31 corresponding thereto is selected, so that the selected data output signal SDO_1 is outputted to the data input signal MISO of the master communication unit 2. At the time point T8, which is the last time point. of the time period between the time point T7 and the time point T8, the master communication unit 2 sets the slave selection signal CS to the low level, which is insignificant, so as to end the communication.

As described above, in the communication apparatus according to Embodiment 3 of the present invention, because the master communication unit 2 sets the slave selection signal CS to "significant" and outputs the synchronization clock signal MCLK and the data output signals MOSI_1 and MOSI_n, the writing command, the writing data, and the reading command can simultaneously be outputted to all the slave communication units 31 and 3n; thus, because the communication time can be shortened, which makes it possible that even a low-processing-ability circuit configuration performs communication processing, the cost can be reduced and the differences in the respective post-communication operation timings of the slaves can also be decreased.

Moreover, because the master communication unit 2 has the data output signals MOSI_1 and MOSI_n, the number of which is the same as the number of the slave communication units 31 and 3n, it is made possible to simultaneously write different commands and different data in the slave communication units 31 and 3n; thus, the communication time can be shortened, i.e., the communication efficiency can be raised.

Still moreover, while the master communication unit 2 outputs the writing command, the writing data, and reading command simultaneously to all the slave communication units 31 and 3n, the logical operation unit 4 outputs to the master communication unit 2 only the data output signal SDO of the highest-priority slave communication unit, among the respective data output signals SDO outputted from the slave communication units 31 and 3n; therefore, interference among the respective data output signals can be prevented.

Furthermore, in the case where the master communication unit 2 outputs the reading command simultaneously to the slave communication units 31 and 3n, the logical operation unit 41 performs logical operation processing in such a way as to output the synchronization clock signals to the slave communication units 31 and. 3n in decreasing order of the communication priority and in such a way as to output the data output signal SDO, outputted from the slave communication units 31 and 3n, to the data input signal MISO of the master communication unit 2; therefore, it is made possible to continuously read the respective data pieces from the slave communication units 31 and 3n.

Moreover, because in the case where the master communication unit 2 outputs the writing command and the reading command simultaneously to the slave communication units 31 and 3n, the logical operation unit 4 performs communication in such a way as to separately output the synchronization clock signal preferentially to the slave communication unit for which the writing command has been issued, data, indicating the state of a failure or the like, that is outputted from the slave communication unit in which data is being written does not interfere with the data output signal SDO outputted from the slave communication unit that has received the reading command; therefore, the master communication unit 2 can separately and continuously read the respective data pieces from the slave communication units 31 and 3n.

Although with regard to the communication apparatus according to Embodiment 3 of the present invention, the case where there exist two slave communication units has been described, the present invention is not limited thereto; it may be allowed that there exist three or more slave communication units. In that case, the number of the data output signals of the master communication unit 2 and the circuit configuration of the logical operation unit 4 are changed in accordance with the number of the slave communication units, so that the operation and effect the same as those in the foregoing case can be obtained.

Embodiment 4

Next, a communication apparatus according to Embodiment 4 of the present invention will be explained. FIG. 10 is a block diagram representing the configuration of a communication apparatus according to Embodiment 4 of the present invention. In comparison with the communication apparatus, represented in FIG. 1, according to Embodiment 1, the logical operation unit 4 is omitted in FIG. 10; the master communication unit 2 has only one slave selection signal CS and two—a number the same as the number of the slave communication units 31 and 3n—data input signal lines MISO_1 and MISO_n; the data input signal lines MISO_1 and MISO_n are connected with the respective data output signals SDO of the slave communication units 31 and 3n.

Next, the operation of the communication apparatus 1 according to Embodiment 4 of the present invention will be explained by use of a timing chart FIG. 11 is a timing chart explaining the operation of the communication apparatus according to Embodiment 4 of the present invention, In FIG. 11, the abscissa denotes the time, and the ordinate denotes the slave selection signal CS from the master communication unit 2, the synchronization clock signal CLK from the master communication unit 2, the data output signal MOSI from the master communication unit 2, and the data output signals MISO_1 and MISO_n from the slave communication units 31 and 3n.

At the time point T1 in FIG. 11, the master communication unit 2, firstly, sets the slave selection signal CS to the high level, which is significant, and outputs the synchronization clock signal CLEC and the data output signal MOSI. The foregoing operation makes it possible to output the writing command, the writing data, and the reading command simultaneously to all the slave communication units 31 and 3n, as is the case with Embodiment 1, described above.

In the time period between the time point T1 and the time point T2 in FIG. 11, the slave communication units 31 and 3n output to the master communication unit 2 the respective data output signals SDO with data pieces, indicating state of a failure or the like in the slave communication units 31 and 3n, that are superimposed on the data output signal SDO, so that in the master communication unit 2, the respective data output signals SDO are inputted to the data input signals MISO_1 and MISO_n in synchronization with the synchronization clock signal and are stored in registers provided in the master communication unit 2 (the number of the registers corresponds to a predetermined data bit length and the bit data length of the register is the same as the number of the slave communication units). Then, at the time point T2 in FIG. 11, the data is restored from the registers that have stored the data, so that the respective states of the slave communication units 31 and 3n can be read.

As described above, in the communication apparatus according to Embodiment 4 of the present invention, because the master communication unit 2 sets the slave selection signal CS to "significant" and outputs the synchronization clock signal CLK and the data output signal MOSI, the writing command, the writing data, and the reading command can simultaneously be outputted to all the slave communication units 31 and 3n; thus, because the communication time can be shortened, which makes it possible that even a low-processing-ability circuit configuration performs communication processing, the cost can be reduced and the differences in the respective post-communication operation timings of the slaves can also be decreased.

Moreover, because the master communication unit 2 has the data input signals MISO_1 and MISO_n, the number of which is the same as the number of the slave communication units 31 and 3n, it is made possible to simultaneously read data pieces from the slave communication units 31 and 3n; thus, the communication time can be shortened, i.e. , the communication efficiency can be raised.

Furthermore, because the master communication unit 2 has the data input signals (MISO_1 and MISO_n), the number of which is the same as the number of the slave communication units, the logical operation unit 4 can be omitted; thus, the circuit scale and the cost can be reduced.

Embodiment 5

Next, an electric power converter according to Embodiment 5 of the present invention will be explained. FIG. 12 is a block diagram representing the configuration of an electric power converter according to Embodiment 5 of the present invention. As represented in FIG. 12, an electric power converter 15 has a U-phase bridge circuit 191, as a U-phase arm, in which a U-phase upper arm formed of a power semiconductor switching device 161 and a U-phase lower arm formed of a power semiconductor switching device 162 are connected in series with each other. Similarly, the electric power converter 15 has a V-phase bridge circuit 192, as a V-phase arm, in which a V-phase upper arm formed of a power semiconductor switching device (unrepresented) and a V-phase lower arm formed of a power semiconductor switching device (unrepresented) are connected in series with each other and a W-phase bridge circuit 193, as a W-phase arm, in which a W-phase upper arm formed of a power semiconductor switching device (unrepresented) and a W-phase lower arm formed of a power semiconductor switching device (unrepresented) are connected in series with each other.

A pair of DC terminals of a three-phase bridge circuit including the U-, V-, and W-phase bridge circuits formed in such a mariner as described above is connected with a chargeable and dischargeable DC power source 17; the connection point between the upper-arm power semiconductor switching device 161 and the lower-arm power semiconductor switching device 162 of each of the U-, V-, and W-phase bridge circuits is connected with a. corresponding AC terminal of the armature winding of a multi-phase rotating electric machine 18. The electric power converter 15 formed as described above performs AC-to-DC electric-power conversion or DC-to-AC electric-power conversion between the DC power source 17 and the multi-phase rotating electric machine 18. In FIG. 12, because the number of phases of the multi-phase rotating electric machine 18 is three, the electric power converter 15 has a phase bridge circuit 191 as the U-phase bridge circuit, a phase bridge circuit 192 as the V-phase bridge circuit, and a phase bridge circuit 193 as the W-phase bridge circuit.

Each of the U-phase bridge circuit 191, the V-phase bridge circuit 192, and the W-phase bridge circuit 193 has a gate driving unit 20 for turning on/off of the power semiconductor switching devices 161 and 162 and a slave communication unit 3, in the gate driving unit 20, that functions as a slave in SPI communication.

The electric power converter 15 has a control unit 21 that controls the U-phase bridge circuit 191, the V-phase bridge circuit. 192, and the W-phase bridge circuit 193, based on the operation state of the multi-phase rotating electric machine 18 and various kinds of information items including information on a failure in the electric power converter 15; in the control unit 21, there is provided the master communication unit 2, as the master in SPI communication, in order to transmit commands to or read data items from the U-phase bridge circuit 191, the V-phase bridge circuit 192, and the W-phase bridge circuit 193. In accordance with the configuration of the master communication unit 2, the control unit 21 is provided with the logical operation unit 4, as explained in Embodiments 1 through 3, described above.

As far as the operation method for the multi-phase rotating electric machine 18 and the specific method for AC-to-DC electric-power conversion or DC-to-AC electric-power conversion by the electric power converter 15 are concerned, various kinds of methods have been proposed or realized in the past and those technologies can be utilized; thus, the explanations therefor will be omitted. Because the contents explained in Embodiments 1 through 3 can also be applied to the method for communication among the master communication unit 2, the slave communication unit 3, and the logical operation unit 4, the explanation therefor will be omitted.

As described above, in the electric power converter according to Embodiment 5 of the present invention, SPI communication between the control unit 21 and each of the U-phase bridge circuit 191, the V-phase bridge circuit 192, and the W-phase bridge circuit 193 is performed through the master communication unit 2 in the control unit 21 and the slave communication unit 3 in each of the U-phase bridge circuit 191, the V-phase bridge circuit 192, and the W-phase bridge circuit 193; because in its configuration, the master communication unit 2 outputs the writing command, the writing data, and the reading command simultaneously to all the communication units 3 in the U-phase bridge circuit 191, the V-phase bridge circuit 192, and the W-phase bridge circuit 193, the communication time can be shortened and hence even a low-processing-ability circuit configuration performs communication processing; therefore, the cost can be reduced and the differences in the respective post-communication operation timings of the slaves can also be decreased.

The master communication unit 2 outputs the writing, command and the writing data simultaneously to all the slave communication units 3; thus, in the electric power converter 15, all the slave communication units 3 can simultaneously be stopped without any time difference among the U-phase bridge circuit 191, the V-phase bridge circuit 192, and the W-phase bridge circuit 193. In addition, it is made possible to prevent a secondary failure, in the power semiconductor switching device 161 or 162, that is caused by power concentration in the U-phase bridge circuit 191, the V-phase bridge circuit 192, or the W-phase bridge circuit 193, which is produced by variations in the stopping times.

Moreover, the master communication unit 2 continuously and separately reads data pieces from the slave communication units 3 after the slave communication units 3 simultaneously issue the respective reading commands; thus, the communication time can be shortened, i.e., the communication efficiency can be raised.

In the scope of the present invention, the embodiments thereof can appropriately be modified or omitted.

INDUSTRIAL APPLICABILITY

The present invention relates to a communication apparatus that performs full-duplex SPI communication and particularly to a communication apparatus that can be applied to the field in which a communication apparatus has at least two slaves for one master and to a communication apparatus that can be applied to the field of an electric power converter utilizing the communication apparatus.

DESCRIPTION OF REFERENCE NUMERALS

1: communication apparatus
2: master communication unit
3, 31, 3n: slave communication unit
4: logical operation unit
5, 51, 5n, 50: AND CIRCUIT
6, 61, 6n: OR circuit
71, 7n: 3-state buffer
8: NOR circuit
91, 9n: RS latch circuit
10: NOR circuit
111, 11n: counter circuit
12: 1st counter circuit
13: 2nd counter circuit
14: 3rd counter circuit
15: electric power converter
161, 162: power semiconductor switching device
17: DC power source
18: multi-phase rotating electric machine
191, 192, 193: phase bridge circuit
20: gate driving unit
21: control unit

The invention claimed is:

1. A communication apparatus comprising:
a master communication unit;
a plurality of slave communication units; and
a logical operation unit comprising a plurality of buffers, wherein the logical operation unit is in a communication path between the master communication unit and the slave communication units, and wherein the logical operation unit, based on a logic operation, couples a selected input signal from a first slave communication unit of the plurality of the slave communication units to the master communication unit,
wherein there is performed serial communication in which the master communication unit outputs a writing command signal simultaneously to the plurality of slave communication units, and
wherein during a period of time that the master communication unit outputs a communication signal to the plurality of slave communication units, the logical operation unit outputs to the master communication unit only a communication signal from the first slave communication unit, wherein the first slave communication unit is of a highest-priority level, among priority levels of the plurality of slave communication units, based on a priority determined through the logic operation.

2. The communication apparatus according to claim 1, wherein the master communication unit has slave selection signal lines, the number of which is the same as the number of the plurality of slave communication units, wherein an input signal inputted to the logical operation unit includes a slave selection signal that is outputted through the slave selection signal line by the master communication unit, and
wherein the logical operation unit applies the logic operation to the slave selection signal and a synchronization clock signal from the master communication unit and then outputs a synchronization clock signal based on the logic operation to the slave communication unit.

3. The communication apparatus according to claim 1, wherein the master communication unit has a single slave selection signal line connected with all of the plurality of slave communication units and synchronization clock signal lines, the number of which is the same as the number of the plurality of slave communication units, and
wherein while setting the slave selection signal transmitted through the single slave selection signal line to be asserted, the master communication unit separately outputs respective synchronization clocks to the plurality of slave communication units through the synchronization clock signal lines.

4. The communication apparatus according to claim 3, wherein the logical operation unit receives the synchronization clock signal from the master communication unit and a data signal outputted by the first slave communication unit and performs the logic operation in such a way as to output to the master communication unit only a data signal of the first slave communication unit.

5. The communication apparatus according to claim 1, wherein the master communication unit has data signal lines, a number of which is the same as the number of the plurality of slave communication units,
wherein the logical operation unit receives all signals that are outputted by the master communication unit and the slave communication units,
wherein when determining that a command outputted by the master communication unit is a writing command, the logical operation unit directly outputs synchronization clock signals outputted by the master communication unit to the plurality of slave communication units, and
wherein when determining that a command outputted by the master communication unit is a reading command, the logical operation unit outputs the synchronization clock signals, outputted by the master communication unit, to the respective slave communication units that are subjects for communication, based on a preliminarily determined priority, and outputs data signals, outputted by the slave communication units, to the master communication unit.

6. A communication apparatus comprising:
a master communication unit;
a logical operation unit comprising a plurality of buffers; and
a plurality of slave communication units,
wherein there is performed serial communication in which: (i) the master communication unit outputs a reading command signal simultaneously to the plurality of slave communication units and (ii) reads, via the logical operation unit, data signals outputted by the plurality of slave communication units, in a sequential and continuous manner for each of the slave communication units, wherein the logical operation unit, based on a logical operation, is configured to couple a selected input signal from a first slave communication unit of the plurality of the slave communication units to the master communication unit,
wherein the master communication unit has a single output signal line connected with all of the plurality of slave communication units and input signal lines, a number of which is the same as the number of the plurality of slave communication units, and
the logical operation units is configured to, during a period of time that the master communication unit outputs a communication signal to the plurality of slave communication units, output to the master communication unit only a communication signal from the first slave communication unit, wherein the first slave communication units of a highest-priority level, among priority levels of the plurality of slave communication units, based on a priority determined through the logic operation.

7. The communication apparatus of claim 1, wherein a second slave communication unit of the plurality of slave communication units is coupled to a first bridge circuit of a rotating electric machine,
wherein the master communication unit outputs a writing command signal simultaneously to the plurality of slave communication units such that the slave communication units can be stopped with a stopping time without any time difference thereby avoiding a variation in the stopping time, and
wherein the avoiding the variation in the stopping time prevents a power concentration in the first bridge circuit.

* * * * *